(12) United States Patent
Sheng et al.

(10) Patent No.: US 10,313,993 B2
(45) Date of Patent: Jun. 4, 2019

(54) SYNCHRONIZATION SIGNAL DETECTION AND TRANSMISSION FOR RADIO SYSTEM

(71) Applicants: Sharp Kabushiki Kaisha, Sakai, Osaka (JP); FG Innovation Company Limited, Tuen Mun, New Territories, Hong Kong (CN)

(72) Inventors: Jia Sheng, Vancouver, WA (US); Tatsushi Aiba, Vancouver, WA (US); Toshizo Nogami, Vancouver, WA (US)

(73) Assignees: Sharp Kabushiki Kaisha, Sakai, Osaka (JP); FG Innovation Company Limited, Tuen Mun (CN)

(*) Notice: Subject to any disclaimer, the term of this patent is extended or adjusted under 35 U.S.C. 154(b) by 0 days.

(21) Appl. No.: 15/934,788

(22) Filed: Mar. 23, 2018

(65) Prior Publication Data

US 2018/0279240 A1    Sep. 27, 2018

Related U.S. Application Data

(60) Provisional application No. 62/476,617, filed on Mar. 24, 2017.

(51) Int. Cl.
*H04B 1/7083* (2011.01)
*H04W 56/00* (2009.01)
*H04J 11/00* (2006.01)

(52) U.S. Cl.
CPC ........ *H04W 56/001* (2013.01); *H04B 1/7083* (2013.01); *H04J 11/0069* (2013.01)

(58) Field of Classification Search
CPC ................ H04W 56/001; H04W 56/0015; H04W 56/00
See application file for complete search history.

(56) References Cited

U.S. PATENT DOCUMENTS

| 6,594,273 | B1 | 7/2003 | McGibney | |
|---|---|---|---|---|
| 2010/0035611 | A1 | 2/2010 | Montojo et al. | |
| 2014/0315561 | A1 | 10/2014 | Hooli et al. | |
| 2015/0009801 | A1* | 1/2015 | Velde | H04W 36/0022 370/218 |
| 2015/0016323 | A1* | 1/2015 | Sundararajan | H04W 52/0209 370/311 |
| 2015/0373572 | A1* | 12/2015 | Sahin | H04W 72/1231 370/252 |
| 2016/0044618 | A1 | 2/2016 | Sheng et al. | |
| 2016/0135179 | A1 | 5/2016 | Yin et al. | |

(Continued)

OTHER PUBLICATIONS

TSG RAN WG1 Meeting #86, "RAN1 Chairman's Notes", Gothenburg, Sweden, Aug. 22-26, 2016.

(Continued)

*Primary Examiner* — Julio R Perez
(74) *Attorney, Agent, or Firm* — Nixon & Vanderhye P.C.

(57) ABSTRACT

In one of its aspects the technology disclosed herein concerns a communications system comprising an access node (22) and a wireless terminal (26). A wireless terminal comprises receiver circuitry and processor circuitry. The receiver circuitry receives wireless communications over an air interface from a radio access network. The processor circuitry changes from using a first periodicity to using a second periodicity to detect a synchronization signal included in the received wireless communications.

8 Claims, 26 Drawing Sheets

(56) References Cited

U.S. PATENT DOCUMENTS

2016/0380751 A1    12/2016   Lindoff et al.

OTHER PUBLICATIONS

TSG RAN WG1 Meeting #87, "RAN1 Chairman's Notes", Reno, USA, Nov. 14-18, 2016.
International Search Report and Written Opinion dated Jun. 14, 2018 in PCT application PCT/US2018/024173.
RP-161596, 3GPP TSG RAN Meeting #73, NTT DOCOMO, "Revision of SI: Study on New Radio Access Technology", New Orleans, Sep. 19-22, 2016.
Sesia et al, "LTE—The UMTS Long Term Evolution: From Theory to Practice", Second Edition, © 2011 John Wiley & Sons Ltd.
R1-1612721, 3GPP TSG RAN WG1 Meeting #87, NTT DOCOMO, Inc., "Discussion and evaluation on NR-PSS/SSS design", Reno, USA, Nov. 14-18, 2016.
3GPP TSG RAN WG1 Meeting #85 Chairman's Notes, Nanjing, China, May 23-27, 2016.
3GPP TSG RAN WG1 Meeting #86bis Chairman's Notes, Lisbon, Portugal, Oct. 10-14, 2016.
R1-1610522, 3GPP TSG RAN WG1 Meeting #85b, Intel Corporation, NTT DOCOMO, ZTE, ZTE Microelectionrics, ETRI, InterDigital, "WF on the unified structure of DL sync signal", Lisbon, Portugal, Oct. 10-14, 2016.
R1-1611268, 3GPP TSG RAN WG1 Meeting #87, ZTE, ZTE Microelectronics, "Considerations on SS block design", Reno, USA, Nov. 14-18, 2016.
3GPP TS 36.211, V 13.2.0, Technical Specification, $3^{rd}$ Generation Partnership Project; Technical Specification Group Radio Access Network; Evolved Universal Terrestrial Radio Access (E-UTRA); Physical channels and modulation (Release 13) (Jun. 2016).
3GPP RAN1 NR Ad Hoc meeting Chairman's Notes, Spokane, USA, Jan. 16-20, 2017.

* cited by examiner

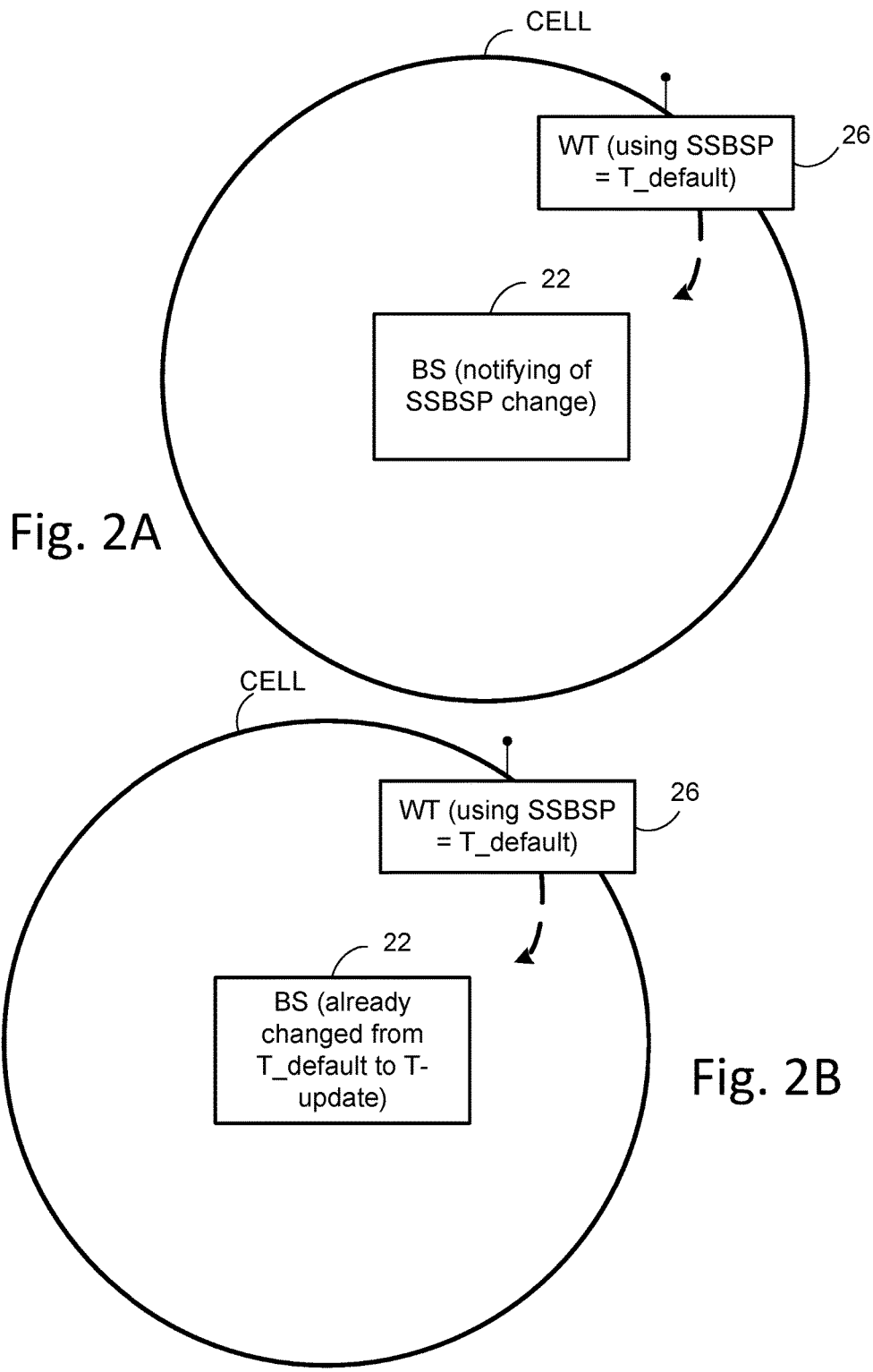

```
┌─────────────────────────────────────────────┐
│ TRANSMITTING SYNCHRONIZATION SIGNAL INFORMATION │ 5-1
│ OVER AN AIR INTERFACE TO THE WIRELESS TERMINAL  │
│           SERVED BY THE NODE                    │
└─────────────────────────────────────────────┘
```

FIG. 5A

```
┌─────────────────────────────────────────────┐
│       SELECTING AN UPDATE SYNCHRONIZATION       │
│   INFORMATION PERIODICITY VALUE FOR USE IN      │ 5B-1
│  TRANSMITTING SYNCHRONIZATION SIGNAL INFORMATION │
└─────────────────────────────────────────────┘
                        │
                        ▼
┌─────────────────────────────────────────────┐
│      TRANSMITTING THE UPDATE SYNCHRONIZATION    │
│        INFORMATION PERIODICITY VALUE AND THE    │ 5B-2
│  SYNCHRONIZATION SIGNAL INFORMATION OVER AN AIR │
│   INTERFACE TO A WIRELESS TERMINAL SERVED BY THE│
│                      NODE                       │
└─────────────────────────────────────────────┘
```

FIG. 5B

```
┌─────────────────────────────────────────────┐
│  GENERATING A SWITCH SIGNAL TO REQUEST THAT THE │
│  WIRELESS TERMINAL CHANGE FROM USING A PREVIOUS │ 5C-1
│  SYNCHRONIZATION INFORMATION PERIODICITY VALUE  │
│  TO USING THE UPDATE SYNCHRONIZATION INFORMATION│
│      PERIODICITY VALUE IN CONJUNCTION WITH A    │
│    SYNCHRONIZATION SIGNAL DETECTION PROCESS     │
└─────────────────────────────────────────────┘
                        │
                        ▼
┌─────────────────────────────────────────────┐
│   TRANSMITTING THE SWITCH SIGNAL TO THE WIRELESS│ 5C-2
│                   TERMINAL                      │
└─────────────────────────────────────────────┘
```

FIG. 5C

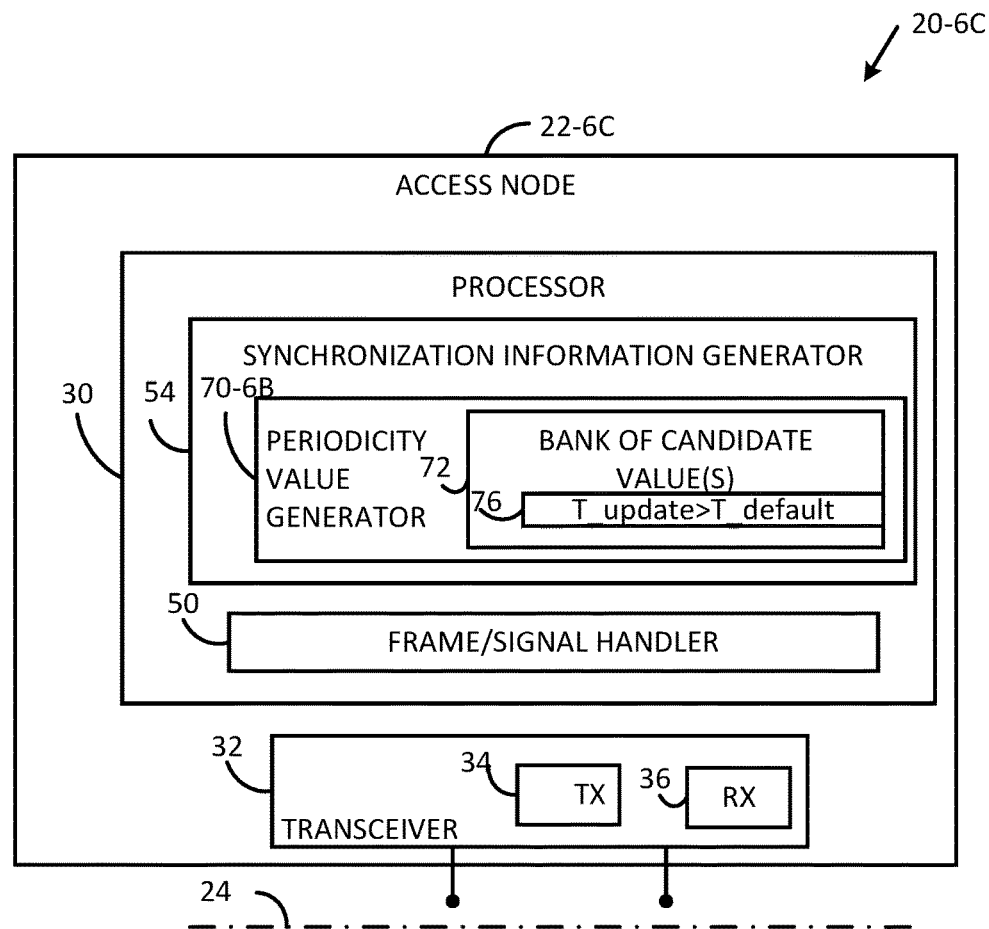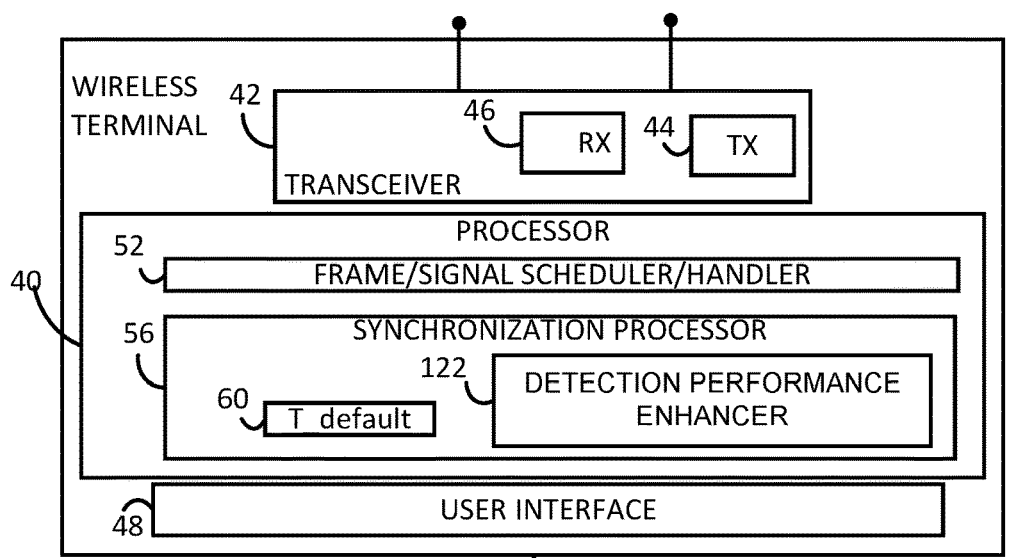
Fig. 6C

SELECTING AND/OR USING A UPDATED SYNCHRONIZATION INFORMATION PERIODICITY VALUE WHICH IS SMALLER THAN A DEFAULT SYNCHRONIZATION INFORMATION PERIODICITY VALUE — 7B-1

Fig. 7B

USING A DEFAULT SYNCHRONIZATION INFORMATION PERIODICITY VALUE WHICH IS SMALLER THAN THE UPDATED SYNCHRONIZATION INFORMATION PERIODICITY VALUE — 8B-1

ADJUSTING DETECTION PERFORMANCE CRITERIA FOR DETECTING THE SYNCHRONIZATION SIGNAL — 8B-2

Fig. 8B

| SELECTING AND/OR USING A UPDATED SYNCHRONIZATION INFORMATION PERIODICITY VALUE WHICH IS SMALLER THAN A DEFAULT SYNCHRONIZATION INFORMATION PERIODICITY VALUE | 7C-1 |

Fig. 7C

| USING A DEFAULT SYNCHRONIZATION INFORMATION PERIODICITY VALUE WHICH IS SMALLER THAN THE UPDATED SYNCHRONIZATION INFORMATION PERIODICITY VALUE | 8C-1 |

↓

| ENHANCING PERFORMANCE CRITERIA FOR DETECTING THE SYNCHRONIZATION SIGNAL | 8C-2 |

Fig. 8C

7D-1
SELECTING AND/OR USING A UPDATED SYNCHRONIZATION INFORMATION PERIODICITY VALUE WHICH IS SMALLER THAN A DEFAULT SYNCHRONIZATION INFORMATION PERIODICITY VALUE 7D-2
INCLUDING PLURAL (MORE) INSTANCES OF THE SYNCHRONIZATION SIGNAL IN A SYNCHRONIZATION SIGNAL BURST SET TO FACILITATE DETECTION BY THE WIRELESS TERMINAL

Fig. 7D 8D-1
USING A DEFAULT SYNCHRONIZATION INFORMATION PERIODICITY VALUE WHICH IS SMALLER THAN THE UPDATED SYNCHRONIZATION INFORMATION PERIODICITY VALUE 8D-2
DETECTING PLURAL (MORE) INSTANCES OF THE SYNCHRONIZATION SIGNAL IN A SYNCHRONIZATION SIGNAL BURST SET TO FACILITATE BETTER DETECTION OF THE SYNCHRONIZATION SIGNAL DESPITE USING THE LARGER DEFAULT SYNCHRONIZATION INFORMATION PERIODICITY VALUE

Fig. 8D

| NEIGHBORING CELL LIST ||
|---|---|
| NEIGHBORING CELL IDENTIFIER | NEIGHBORING CELL DEFAULT SS PERIODICTY VALUE |
| $CELL_2$ | $T\_default_2$ |
| $CELL_3$ | $T\_default_3$ |
| ... | ... |
| $CELL_n$ | $T\_default_n$ |

| NEIGHBORING CELL LIST |||
|---|---|---|
| NEIGHBORING CELL IDENTIFIER | NEIGHBORING CELL DEFAULT SS PERIODICTY VALUE | NEIGHBORING CELL UPDATE SS PERIODICTY VALUE |
| $CELL_2$ | $T\_default_2$ | $T\_update_2$ |
| $CELL_3$ | $T\_default_3$ | $T\_update_3$ |
| ... | ... | ... |
| $CELL_n$ | $T\_default_n$ | $T\_update_n$ |

Fig. 12B

SYNCHRONIZATION SIGNAL DETECTION AND TRANSMISSION FOR RADIO SYSTEM

This application claims the priority and benefit of U.S. Provisional Patent Application 62/476,617, filed Mar. 24, 2017, which is incorporated herein by reference in its entirety.

TECHNICAL FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

Work has started in the International Telecommunications Union (ITU) and 3GPP to develop requirements and specifications for new radio (NR) 5G systems, e.g., fifth generation systems. Within the scope of 3GPP, a new study item (SID) "Study on New Radio Access Technology" has been approved. The timeline and the study situations of NR development are summarized in RP-161596, "Revision of SI: Study on New Radio Access Technology", 3GPP TSG RAN Meeting #73, New Orleans, Sep. 19-22, 2016. In order to fulfill 5G requirements, changes with regard to 4G LTE system have been proposed for study, such as higher frequency spectrum usage (e.g., 6 GHz, 40 GHz or up to 100 GHz), scalable numerology (e.g., different subcarrier spacing (SCS), 3.75 KHz, 7.5 KHz, 15 KHz (current LTE), 30 KHz . . . possibly 480 KHz), beam based initial access (one traditional cell may contain multiple beams due to the particular beamforming adopted).

In an LTE system, hierarchical synchronization signals, i.e., primary synchronization sequences (PSS) and secondary synchronization sequences (SSS) provide coarse time/frequency synchronization, physical layer cell ID (PCI) identification, subframe timing identification, frame structure type (FDD or TDD) differentiation and cyclic prefix (CP) overhead identification. On the other hand, in the legacy LTE system, a physical broadcast channel (PBCH) provides further information, such as system frame number (SFN) and essential system information so that a wireless terminal (e., UE) can obtain information to access the network.

In LTE system, three PSS sequences provide identification of cell ID (0-2); and SSS sequences provide identification of cell ID group (0-167). Therefore, in all 168*3=504 PCI IDs are supported in the LTE system.

It is anticipated that in the next generation new radio (NR) technology, a cell corresponds one or multiple transmission and reception point (TRPs). This means multiple TRPs can share the same NR cell ID, or each transmission and reception point (TRP) may have its own identifier. Further, the transmission of one TRP can be in the form of single beam or multiple beams. Each of the beams may also possibly have its own identifier. FIG. 14 provides a simple example depiction of a relationship between cell, transmission and reception point (TRP), and beam.

It has been agreed in RAN1 #86bis meeting (See, e.g., 3GPP RAN1 #86bis Chairman's Notes) that:

PSS, SSS and/or PBCH can be transmitted within a 'SS block'
   Multiplexing other signals are not precluded within a 'SS block'
One or multiple 'SS block(s)' compose an 'SS burst'
One or multiple 'SS burst(s)' compose a 'SS burst set'
   The Number of SS bursts within a SS burst set is finite.
   From RAN1 specification perspective, NR air interface defines at least one periodicity of SS burst set (Note: Interval of SS burst can be the same as interval of SS burst set in some cases, e.g., single beam operation)

FIG. 1 is an example NR SS block structure according to the RAN1 #86bis meeting. In FIG. 2, "synchronization signal bursts series" represents a "SS burst set". Additional detailed examples are illustrated in R1-1610522, "WF on the unified structure of DL sync signal", Intel Corporation, NTT DOCOMO, ZTE, ZTE Microelectronics, ETRI, InterDigital, Lisbon, Portugal, 10-14 Oct. 2016.

Thus, as indicated above, one or multiple SS block(s) compose an SS burst. One or multiple SS burst(s) further composes a SS burst set where the number of SS bursts within a SS burst set is finite. If it is always the case that one SS burst composes an SS burst set, then there is actually no meaning for defining SS burst, or a definition of SS burst is not necessary. From physical layer specification perspective, at least one periodicity of SS burst set is supported. From the UE perspective, SS burst set transmission is periodic and a UE may assume that a given SS block is repeated with a SS burst set periodicity, which means SS block may have different periodicity than the SS burst set.

According to 3GPP RAN1 #87 Chairman's Notes, it has been further agreed in [4] that, from the UE perspective, SS burst set transmission is periodic, and that at least for initial cell selection, the UE may assume a default periodicity of SS burst set transmission for a given carrier frequency In LTE, PSS/SSS and PBCH have different periodicity due to different detection performance requirements and different methods to combat channel distortion (PBCH has channel coding and repetition to combat channel distortion, while PSS/SSS does not).

For initial cell selection for a new radio (NR) cell, the UEs assume a default SS burst set periodicity per frequency carrier. In a cellular network, the CONNECTED mode UEs might need to do the measurement (RSRP/RSRQ or their equivalent measurement) to perform handover; while the IDLE mode UEs might need to do the measurement to perform cell selection/reselection. In legacy LTE systems, the SS transmission has only one fixed periodicity (5 ms) throughout the network; while in NR systems, one value from a set of SS burst set periodicities might be configured to the UE.

For CONNECTED and IDLE mode UEs (UEs already camping on NR cells), New Radio supports network indication of SS burst set periodicity and information to derive measurement timing/duration (e.g., time window for NR-SS detection). The network provides one SS burst set periodicity information per frequency carrier to the UE and information to derive measurement timing/duration if possible. In case that one SS burst set periodicity and one information regarding timing/duration are indicated, the UE assumes the periodicity and timing/duration for all cells on the same carrier. If the network does not provide an indication of SS burst set, periodicity and information to derive measurement timing/duration the UE should assume 5 ms as the SS burst set periodicity. New Radio supports a set of SS burst set periodicity values for adaptation and network indication.

For the purpose of detecting a non-standalone NR cell (e.g., NR carrier not supporting initial access, or other reasons the UE will not camp on the NR cell), NR-SS can still be used at least for cell identification and initial synchronization, and CONNECTED mode RRM measurements. Similarly as for CONNECTED and IDLE mode UEs, NR supports network indication of SS burst set periodicity and information to derive measurement timing/duration (e.g., time window for NR-SS detection). The network provides one SS burst set periodicity information per frequency carrier to UE and information to derive measurement timing/duration if possible. In case that one SS burst set periodicity and one information regarding timing/duration are indicated, the UE assumes the periodicity and timing/duration for all cells on the same carrier. New Radio supports a set of SS burst set periodicity values for adaptation and network indication.

In light of the foregoing, various technical questions and challenges remain. For example:

(1) What if the UE's assumption on SS burst set periodicity is different from the network configuration, especially when there is an update on SS burst set periodicity in the cell to change the periodicity from default value to other value?
(2) What if more than one periodicity/timing/duration can be configured to UE and UE has no apriori information about it?
(3) What if different cells are configured with different SS burst set periodicity, especially when the neighboring cells are configured with different frequency carriers?

What is needed, therefore, and example objects of the technology disclosed herein, are methods, apparatus, and techniques to address one or more of the foregoing technical challenges.

SUMMARY

In one of its example aspects the technology disclosed herein concerns a wireless terminal or user equipment (UE) method of operating same. The wireless terminal comprises processor circuitry and transmitting circuitry. The receiver circuitry is configured to receive wireless communications over an air interface from a radio access network. The processor circuitry is configured to change from using a first periodicity to using a second periodicity to detect a synchronization signal included in the received wireless communications.

In another of its aspects the technology disclosed herein concerns a wireless terminal and method of operating same. In a basic embodiment and mode the wireless terminal comprising receiver circuitry and processor circuitry. The receiver circuitry is configured to receive broadcasting system information, including information used for configuring a second periodicity of a synchronization signal block (SSB) comprising, at least, a primary synchronization signal (PSS) and a secondary synchronization signal (SSS) and a physical broadcast channel (PBCH). The processor circuitry configured to acquire time and frequency synchronization based on the reception of the SSB, wherein for an initial cell selection, a first periodicity of the SSB is assumed for acquiring the time and frequency synchronization.

In another of its aspects the technology disclosed herein concerns a node of a radio access network and method of operating same. In a basic example embodiment and mode the node comprises processor circuitry and transmitter circuitry. The processor circuitry is configured to generate: system information, including information used for configuring a second periodicity of a synchronization signal block (SSB) comprising, at least, a primary synchronization signal (PSS) and a secondary synchronization signal (SSS) and a physical broadcast channel (PBCH); and a signal to indicate to the wireless terminal that the wireless terminal is to update the periodicity utilized by the wireless terminal when the wireless terminal is to change from using a first periodicity to using the second periodicity. The transmitter circuitry is configured to broadcast the system information and the signal over an air interface to the wireless terminal.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2A-FIG. 2C are diagrammatic views depicting differing scenarios of acquiring or coordinating use of synchronization information periodicity value(s).

FIG. 5A-FIG. 5D are flowcharts showing example, non-limiting, representative acts or steps performed by the network nodes of the systems of FIG. 3A-FIG. 3D, respectively.

FIG. 6A-FIG. 6D are schematic views showing example communications systems comprising differing configurations of radio access nodes and a wireless terminal, and wherein a wireless terminal, which may still be using a default synchronization signal burst set periodicity value, seeks to communicate with a network which has changed to an update synchronization signal burst set periodicity value.

FIG. 7A-FIG. 7D are flowcharts showing example, non-limiting, representative acts or steps performed by the network nodes of the systems of FIG. 7A-FIG. 7D, respectively.

FIG. 8A-FIG. 8D are flowcharts showing example, non-limiting, representative acts or steps performed by the wireless terminals of the systems of FIG. 7A-FIG. 7D, respectively.

FIG. 12A and FIG. 12B are diagrammatic views of example neighboring cell lists according to differing example implementations.

DETAILED DESCRIPTION

Figure 1:
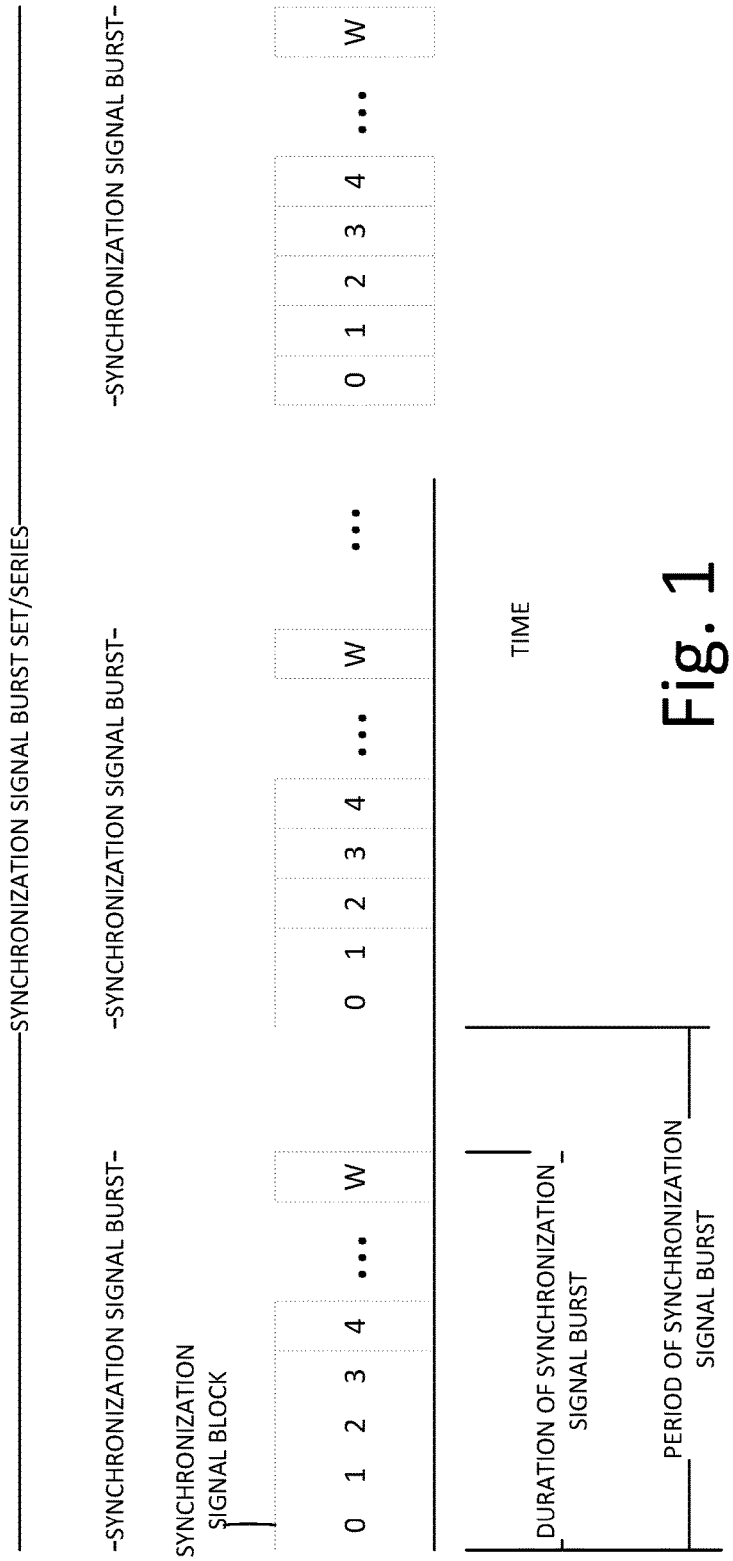
FIG. 1 is a diagrammatic view showing example NR SS block structure according to the RAN1 #86bis meeting.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, tablets, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of an access node may include, in the 3GPP specification, a Node B ("NB"), an enhanced Node B ("eNB"), a home eNB ("HeNB"), or in the 5G terminology, a gNB or even a transmission and reception point (TRP), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, . . . ), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

Figure 2:
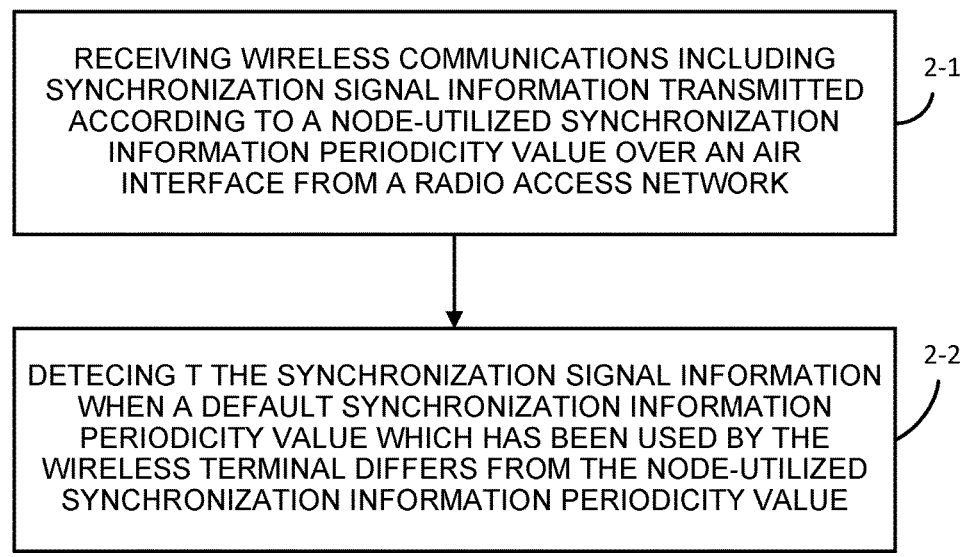
FIG. 2 is a flowchart showing example, non-limiting, representative generic acts performed by a wireless terminal according to various embodiments described herein.
Figure 2C:
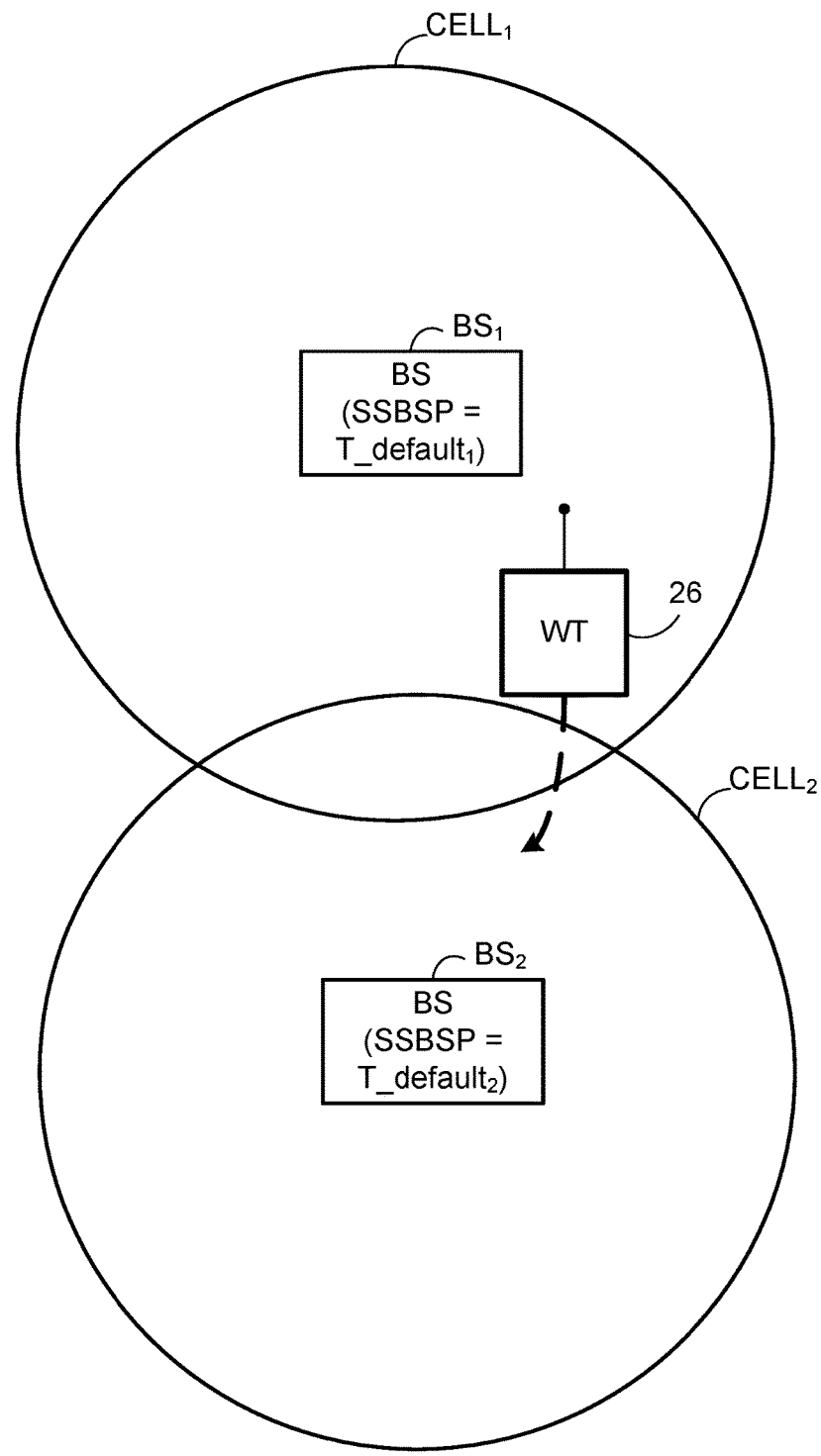

The technology disclosed herein concerns, as one of its example aspects, a generic wireless terminal comprising receiver circuitry and processor circuitry. The receiver circuitry is configured to receive wireless communications including synchronization signal information transmitted according to a node-utilized synchronization information periodicity value over an air interface from a radio access network. The processor circuitry is configured to detect the synchronization signal information when a default synchronization information periodicity value which has been used by the wireless terminal differs from the node-utilized synchronization information periodicity value. FIG. 2 shows example, representative acts or steps performed by such generic wireless terminal. For example, act 2-1 comprises receiving wireless communications including synchronization signal information transmitted according to a node-utilized synchronization information periodicity value over an air interface from a radio access network. Act 2-2 comprises using processor circuitry to detect the synchronization signal information when a default synchronization information periodicity value which has been used by the wireless terminal differs from the node-utilized synchronization information periodicity value. Given such generic wireless terminal structure and method, the technology disclosed herein encompasses various example system, methods, and techniques for acquiring synchronization information periodicity value, such as (for example) in the example, non-limiting circumstances shown in FIG. 2A, FIG. 2B, and FIG. 2C. FIG. 2A depicts a situation in which a network desires to change the synchronization information periodicity value with which a wireless terminal is operating, e.g., to change from a first synchronization signal burst set periodicity (SSBSP) value to a second synchronization signal burst set periodicity value. FIG. 2B depicts a situation in which a network has updated the synchronization information periodicity value (SSBSP) from default values to other values, e.g., to an updated synchronization information periodicity value (updated SSBSP), while an initial access stage wireless terminal still assumes that the operative synchronization information periodicity value is the default synchronization information periodicity value (default SSBSP). FIG. 2C shows a situation in which a wireless terminal seeks to know the default synchronization signal burst set periodicity value of a neighboring cell.

Figure 3A:
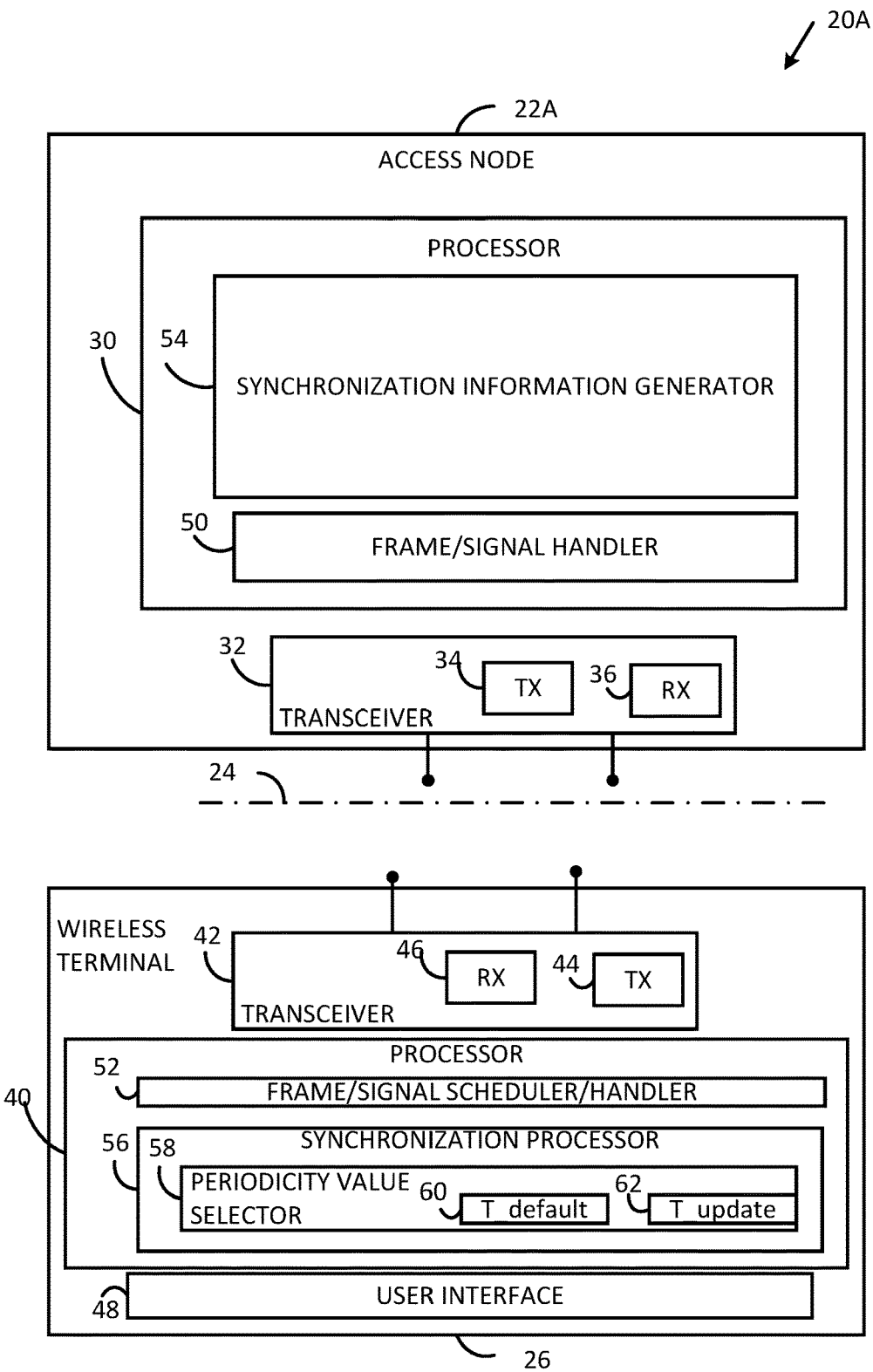
FIG. 3A-FIG. 3F are schematic views showing example communications systems comprising differing configurations of radio access nodes and a wireless terminal, and wherein the wireless terminal is configured to change synchronization information periodicity values.

FIG. 3A shows an example communications system 20A wherein radio access node 22A communicates over air or radio interface 24 (e.g., Uu interface) with wireless terminal 26. As mentioned above, the radio access node 22A may be any suitable node for communicating with the wireless terminal 26, such as a base station node, or eNodeB ("eNB") or gNodeB or gNB, for example. The node 22A comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22A and radio interface 24, the respective transceiver circuitries 22 include antenna(s). The respective transmitter circuits 36 and 46 may comprise, e.g., amplifier(s), modulation circuitry and other conventional transmission equipment. The respective receiver circuits 34 and 44 may comprise, e.g., e.g., amplifiers, demodulation circuitry, and other conventional receiver equipment.

In general operation node, access node 22A and wireless terminal 26 communicate with each other across radio interface 24 using predefined configurations of information. By way of non-limiting example, the radio access node 22A and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, or symbol, slot, mini-slot in 5G for example).

To cater to the transmission of information between radio access node 22A and wireless terminal 26 over radio interface 24, the node processor 30 and terminal processor 40 of FIG. 3 are shown as comprising respective information handlers. For an example implementation in which the information is communicated via frames, the information handler for radio access node 22A is shown as node frame/signal scheduler/handler 50, while the information handler for wireless terminal 26 is shown as terminal frame/signal handler 52. The terminal processor 40 further comprises synchronization information generator 54.

Wireless terminal 26 needs to be in synchronization with the radio access network. Strategic times for synchronization of wireless terminal 26 include for initial selection of a cell of the radio access network, when in CONNECTED mode, and when in IDLE mode (already camping on a cell of the radio access network). In order to detect a synchronization information transmitted by the radio access node 22 of a cell, and thus synchronize with the radio access network, the wireless terminal 26 needs to know with what periodicity the synchronization information is transmitted. Knowing the periodicity of the synchronization information enables the wireless terminal 26 to configure a synchronization information detection window for reception of the synchronization information.

As used herein, "synchronization information" generically encompasses one or more of a synchronization signal(s), a synchronization signal block(s), a synchronization signal burst(s), and a synchronization signal burst set(s), as understood with reference to FIG. 1 and above discussion thereof. In view of such generic terminology, as used herein "synchronization information periodicity value" encompasses and thus includes one or more of (1) a synchronization signal periodicity value, (2) a synchronization signal burst periodicity value, (3) a synchronization signal burst set periodicity value, and (4) any combination of (1)-(3). Thus, synchronization information periodicity value expressly includes but is not limited to synchronization signal burst set periodicity (SSBSP). In fact, as used herein, the terminology (1)-(4) may be used interchangeably. For example, reference herein to "SS burst set periodicity (SSBSP)" may mean either SS burst set periodicity, or SS burst periodicity, or SS periodicity, or any combinations of them. For simplicity, SSBSP may at time be used for presentation simplicity and convenience. Reference herein to "base station" may be represented as gNB, or gNB, or eNB, for example.

From UE perspective, SS burst set transmission is periodic. For initial cell selection, the UE assumes a default periodicity (X ms) of SS burst set transmission for a given carrier frequency. There is only one default periodicity (T_default) defined for each given carrier frequency.

For CONNECTED and IDLE mode UEs (UEs already camped on NR cells), NR supports network indication of SS burst set periodicity and information to derive measurement timing/duration (e.g., time window for NR-SS detection).

In prior systems the periodicity the synchronization information may be uniform and thus known throughout the radio access network. Moreover, in prior systems the synchronization information may remain constant and not change. But in systems and technology described herein, different cells may have differing synchronization information periodicity values. For example, different cells having the same carrier frequency (intra-frequency cells) and/or different cells having differing carrier frequency (inter-frequency cells) may have differing synchronization information periodicity value. Moreover, the network may, for particular wireless terminals, change the synchronization information periodicity value from time to time.

The use of differing and/or changing synchronization information periodicity values may arise from a tension between wireless terminal considerations and radio access network considerations. A wireless terminal vendor may desire, for example, for the wireless terminal to use a synchronization information periodicity value that is relatively short, in order to keep good wireless terminals synchronization detection performance and thus fast access to the network.

On the other hand, a radio access network operator may prefer that the network have a higher synchronization information periodicity value, so that the radio access network need not transmit the synchronization information periodicity value as frequently and thereby need not devote as many network resources to synchronization. For example, the network operator may determine that traffic conditions are such that signaling needs to be minimized, and therefore the network operator may configure one or more cells of the network to change to a longer synchronization information periodicity value. A longer synchronization information periodicity value generally means less synchronization signaling traffic. Alternatively, there may be times (e.g., night-time) when the network is not as busy, and the operator is inclined to allow a shorter synchronization information periodicity value in some cells. A shorter synchronization information periodicity value conversely means more synchronization signaling traffic.

As mentioned above, in a generic scenario a wireless terminal wireless may receive wireless communications including synchronization signal information transmitted according to a node-utilized synchronization information periodicity value over an air interface from a radio access network. The generic wireless terminal is configured to detect the synchronization signal information when a default synchronization information periodicity value which has been used by the wireless terminal differs from the node-utilized synchronization information periodicity value. Various example more specific scenarios are described below including (A) wireless terminals changing/updating synchronization information periodicity value; (b) resolving use by networks and terminals of differing synchronization information periodicity values; and (C) wireless terminals acquiring synchronization information periodicity values for neighboring cells.

A. Wireless Terminals Changing/Updating Synchronization Information Periodicity Value FIG. 2A depicts a situation in which a network desires to change the synchronization information periodicity value with which a wireless terminal is operating, e.g., to change from a first synchronization signal burst set periodicity value to a second synchronization signal burst set periodicity value. For example, the network (e.g., radio access node 22 of FIG. 2A) may know that wireless terminal 26 is using a default synchronization signal burst set periodicity value, and the network wishes to direct the wireless terminal 26 instead to use an update synchronization signal burst set periodicity value. FIG. 3A-FIG. 3F illustrate certain communications systems in which a wireless terminal changes from a first synchronization information periodicity value to a second synchronization information periodicity value.

The wireless terminal 26A of FIG. 3A is a wireless terminal that is configured with a first synchronization information periodicity value, but which may change from using the first synchronization information periodicity value in order to use a second synchronization information periodicity value for the purpose of detecting a synchronization signal included in wireless communications received from the radio access network, e.g., from radio access node 22. The terminal processor 40 comprises terminal synchronization processor 56, which in turn comprises terminal periodicity value selector 58. The terminal synchronization processor 56 stores or has access to both the first synchronization information periodicity value and the second synchronization information periodicity value. In an example non-limiting example implementation, the first synchronization information periodicity value comprises a default synchronization information periodicity value 60 (e.g., T_default), and the second synchronization information periodicity value comprises an update synchronization information periodicity value 62 (T_update).

Figure 4A:
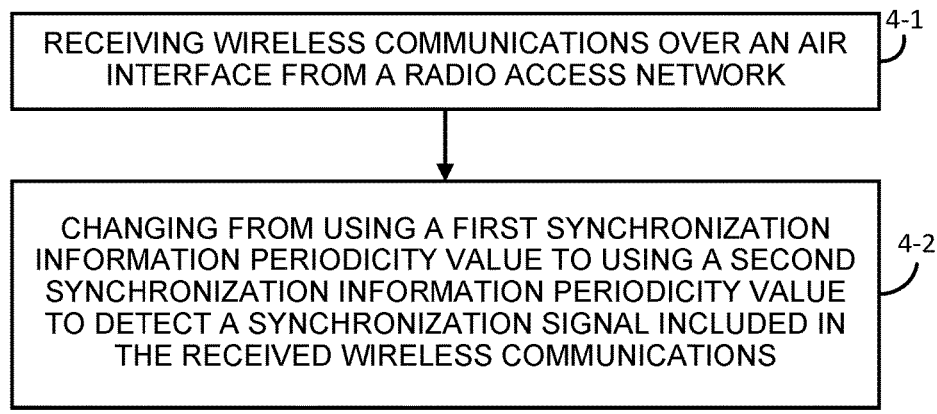
FIG. 4A-FIG. 4E are flowcharts showing example, non-limiting, representative acts or steps performed by the wireless terminals of the systems of FIG. 3A-FIG. 3D, respectively.

FIG. 4A shows example, basic, non-limiting acts or steps performed by wireless terminal 26A of FIG. 3A. Act 4-1 comprises the wireless terminal 26A receiving wireless communications over an air interface from a radio access network. Act 4-2 comprises the wireless terminal 26A changing from using a first synchronization information periodicity value (e.g., default synchronization information periodicity value 60) to using a second synchronization information periodicity value (e.g., update synchronization information periodicity value 62) to detect a synchronization signal included in the received wireless communications in a synchronization signal detection process performed by processor circuitry.

FIG. 5A shows example, basic, non-limiting acts or steps performed by radio access node 22A of FIG. 3A. Act 5-1 comprises the radio access node 22A transmitting synchronization signal information over an air interface to the wireless terminal 26A served by the node 22A.

In the example embodiment and mode illustrated in FIG. 3A, the second synchronization information periodicity value, e.g., the update synchronization information periodicity value 62, is preconfigured at wireless terminal 26A. But in a different example embodiment and mode illustrated in FIG. 3B, the second synchronization information periodicity value (e.g., update synchronization information periodicity value 62) is signaled to the wireless terminal 26B from the radio access network. Components and elements of the communications system 20B of FIG. 3B, and of other systems described herein, that have the same reference numbers as the communications system 20A of FIG. 3A are understood to comprise similar structures and functionalities as above described for FIG. 1A unless otherwise noted.

Figure 3B:
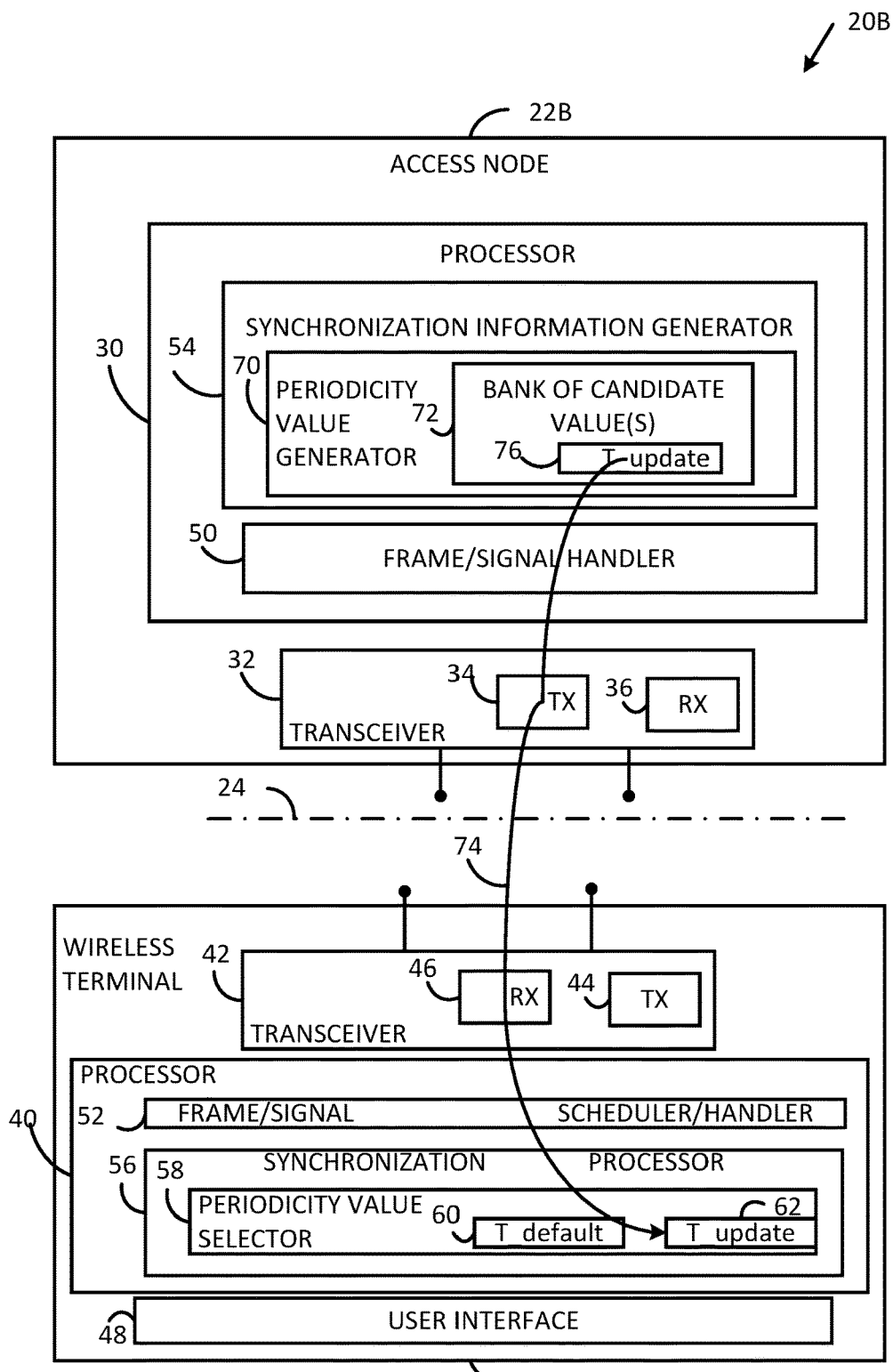

The signaling of the second synchronization information periodicity value in the FIG. 3B embodiment and mode is facilitated by synchronization information periodicity value generator 70 which comprises synchronization information generator 54. FIG. 3B particularly shows that synchronization information periodicity value generator 70 comprises or has access to a bank 72 of one or more candidate values that may be selected to serve as the second synchronization information periodicity value, e.g., as the updated synchronization information periodicity value for the wireless terminal 26B. FIG. 3B also shows by arrow 74 a signaling including identification of a selected second synchronization information periodicity value (e.g., updated synchronization information periodicity value 76), the signal 74 being included in a frame and transmitted over the air interface 24. The node-selected update synchronization information periodicity value 76 identified by signal 74 is received by terminal receiver circuitry 46 of wireless terminal 26B, obtained from a frame by terminal frame/signal handler 52, and stored by terminal synchronization processor 56 as update synchronization information periodicity value 62.

Figure 4B:
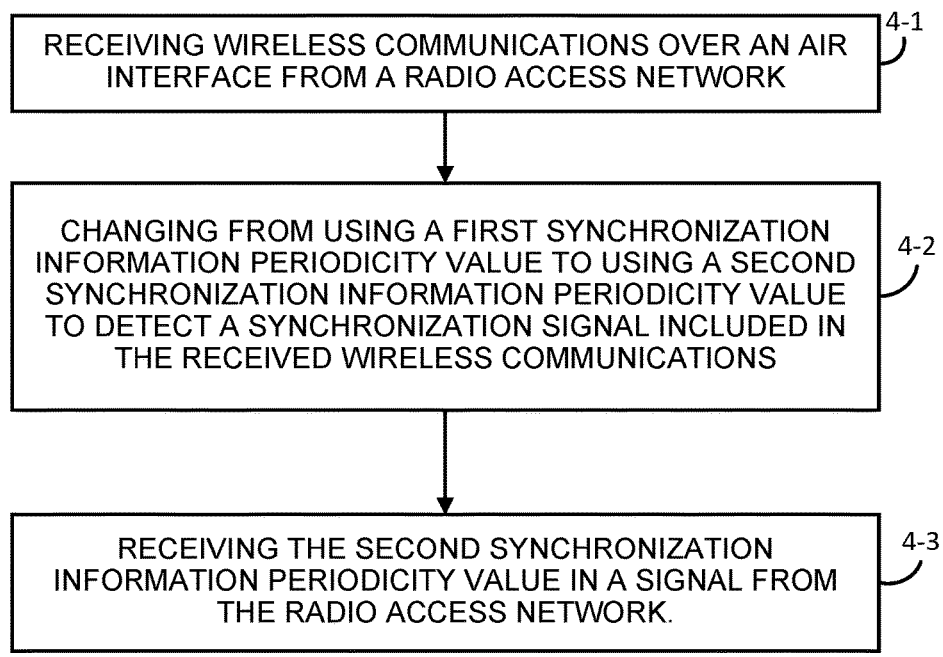

FIG. 4B shows example, basic, non-limiting acts or steps performed by wireless terminal 26B of FIG. 3B. Act 4-1 and act 4-2 of FIG. 4B are those of FIG. 4A. Act 4-3 of FIG. 4B comprises receiving the second synchronization information periodicity value in a signal from the radio access network.

FIG. 5B shows example, basic, non-limiting acts or steps performed by radio access node 22 of FIG. 3B. Act 5B-1 comprises the radio access node 22B selecting an update synchronization information periodicity value for use in transmitting synchronization signal information. Act 5B-2 comprises transmitting the update synchronization information periodicity value and the synchronization signal information over an air interface to a wireless terminal served by the node. The transmissions of act 5B-2 may be in different signals.

Figure 3C:
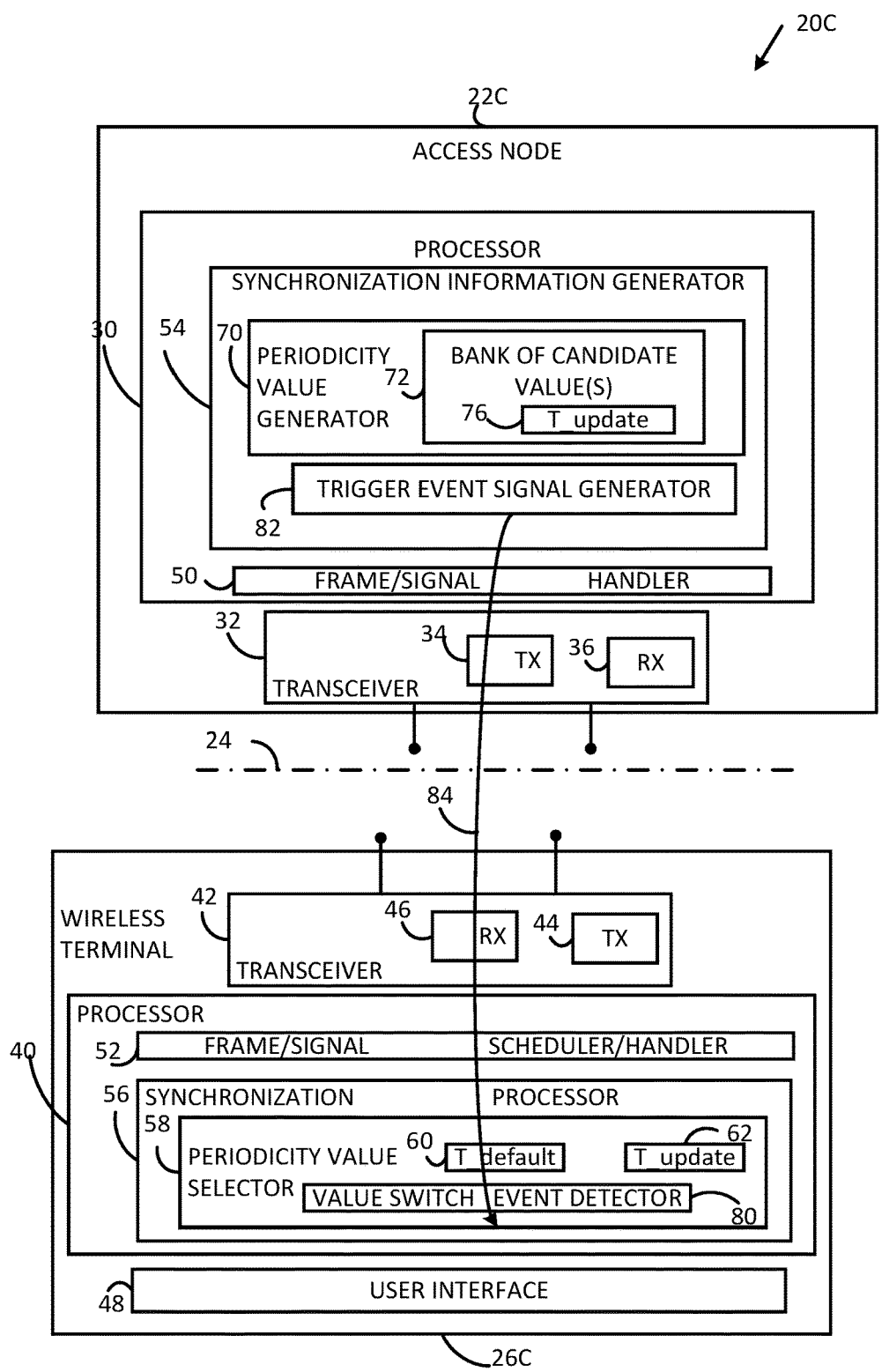

FIG. 3C illustrates an example embodiment and mode in which the wireless terminal 26C switches or changes from using the first synchronization information periodicity value to using the second synchronization information periodicity value upon occurrence of a predetermined event. For the example embodiment and mode of FIG. 3C, the terminal processor 40, and terminal periodicity value selector 58 in particular, comprises terminal periodicity value switch event detector 80. The terminal periodicity value switch event detector 80 serves to detect an event that is intended to trigger the terminal periodicity value selector 58 to change from using the first synchronization information periodicity value to using the second synchronization information periodicity value. Non-limiting examples of such triggering events are described below.

Figure 4C:
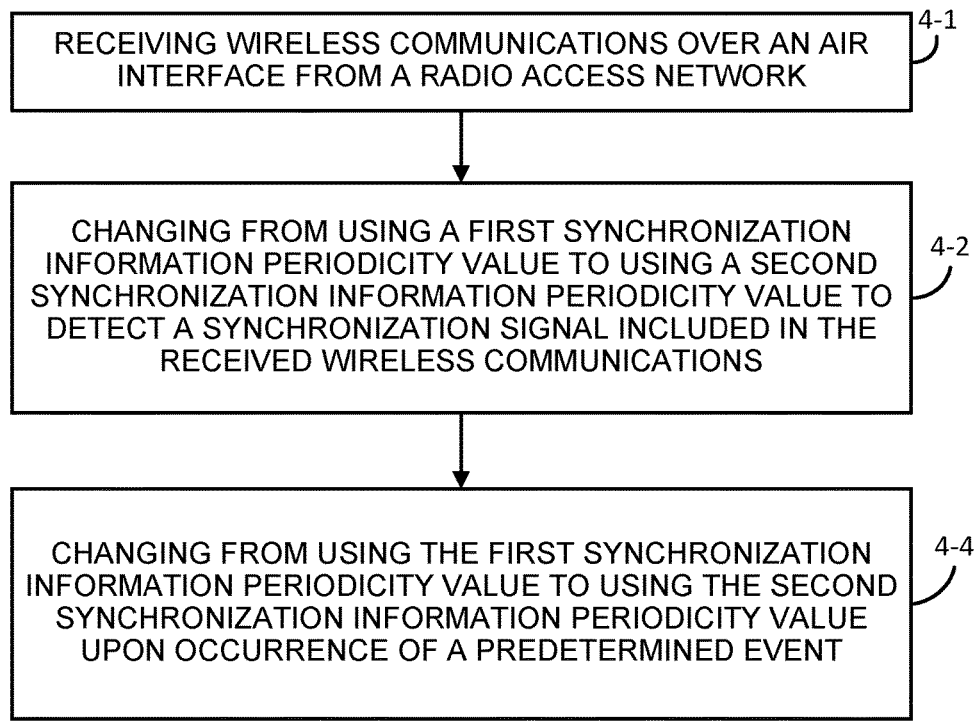

FIG. 4C shows example, basic, non-limiting acts or steps performed by wireless terminal 26C of FIG. 3C. Act 4-1 and act 4-2 of FIG. 4C are those of FIG. 4C. Act 4-4 of FIG. 4C comprises the wireless terminal 26C changing from using the first synchronization information periodicity value to using the second synchronization information periodicity value upon occurrence of a predetermined event.

One example of a triggering event that is detected by terminal periodicity value switch event detector 80 and causes the terminal periodicity value selector 58 to change from using the first synchronization information periodicity value to using the second synchronization information periodicity value is illustrated in FIG. 3C. The FIG. 3C example of a triggering event comprises receipt of a switch signal from the radio access network. The synchronization information generator 54 of FIG. 3C comprises trigger event signal generator 84. The trigger event signal generator 84 generates trigger event signal 86 which is included in a frame transmitted to wireless terminal 26C and detected by terminal periodicity value switch event detector 80. In an example, non-limiting embodiment and mode, trigger event signal 86 may comprise a one bit information element (IE). Such one bit information element (IE) indicative of the trigger event signal generator 84 may be included in broadcast signaling and/or dedicated signaling to the CONNECTED mode UE, or in the broadcast signaling to the IDLE mode UE. For example, the one bit may indicate the current synchronization information periodicity value (e.g., SSBSP is T_default) or alternatively may indicate an updated synchronization information periodicity value (e.g., SSBSP is T_update), e.g., "0" may represent T_default and "1" may represent T_update, or visa-versa.

FIG. 5C shows example, basic, non-limiting acts or steps performed by radio access node 22 of FIG. 3C according to the foregoing example. Act 5C-1 comprises the radio access node 22B generating a switch signal to request that the wireless terminal change from using a previous synchronization information periodicity value to using the update synchronization information periodicity value in conjunction with a synchronization signal detection process. Act 5C-2 comprises the node transmitter circuitry transmitting the switch signal to the wireless terminal.

Figure 3D:
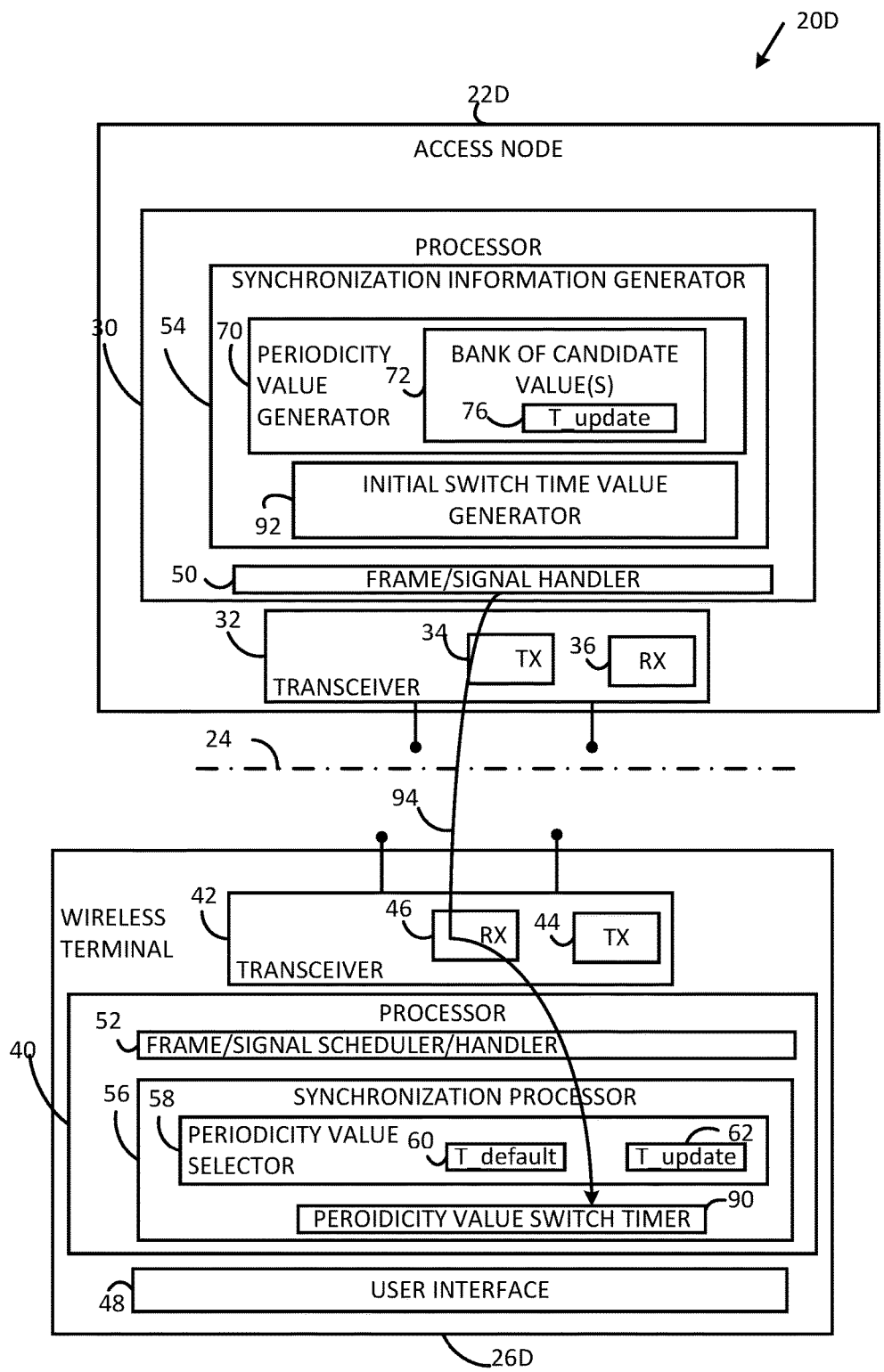
Figure 4D:
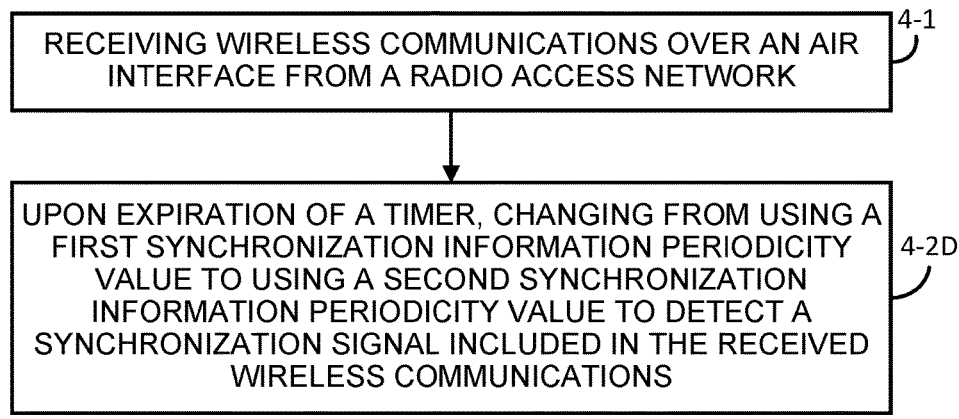

Another example of a triggering event that is detected by terminal periodicity value switch event detector 80 and causes the terminal periodicity value selector 58 to change from using the first synchronization information periodicity value to using the second synchronization information periodicity value is illustrated in FIG. 3D. The FIG. 3D example of a triggering event, a predetermined that causes the change, comprises expiration of a switch timer. FIG. 3D shows terminal synchronization processor 56 as comprising periodicity value switch timer 90. The periodicity value switch timer 90 is loaded or initialized with an initial switch time value. After the periodicity value switch timer 90 reaches the initial switch time value (e.g., counts down from the initial switch time value to zero, or counts from zero to the initial switch time value), the periodicity value switch timer 90 expires. Expiration of periodicity value switch timer 90 generates a signal or is otherwise detected by terminal periodicity value selector 58, which then changes from use of the first synchronization information periodicity value to use of the second synchronization information periodicity value. In an example embodiment and mode, the initial switch time value may be preconfigured at wireless terminal 26D. In an alternate example embodiment and mode, the initial switch time value may be signaled to the wireless terminal 26D by the radio access network, e.g., from radio access node 22D. In the latter regard, FIG. 4D shows the latter example embodiment and mode wherein synchronization information generator 54 comprises initial switch time value generator 92, which generates the initial switch time value for transmission (as indicated by arrow 94 in FIG. 3D) to wireless terminal 26D. The initial switch time value is loaded into the periodicity value switch timer 90 so that the periodicity value switch timer 90, upon expiration, may inform or be detected by the terminal periodicity value selector 58 for changing from the first synchronization information periodicity value to the second synchronization information periodicity value.

FIG. 4D shows example, basic, non-limiting acts or steps performed by wireless terminal 26D of FIG. 3D. Act 4-1 of FIG. 4D is the same as act 4-1 of FIG. 4A. However, act 4-2D of FIG. 4D comprises changing from the first synchronization information periodicity value to the second synchronization information periodicity value upon expiration of a switch timer.

Figure 5D:
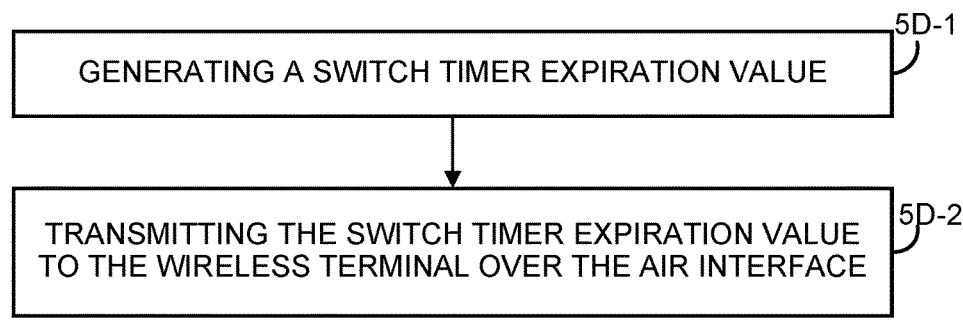
Figure 14:
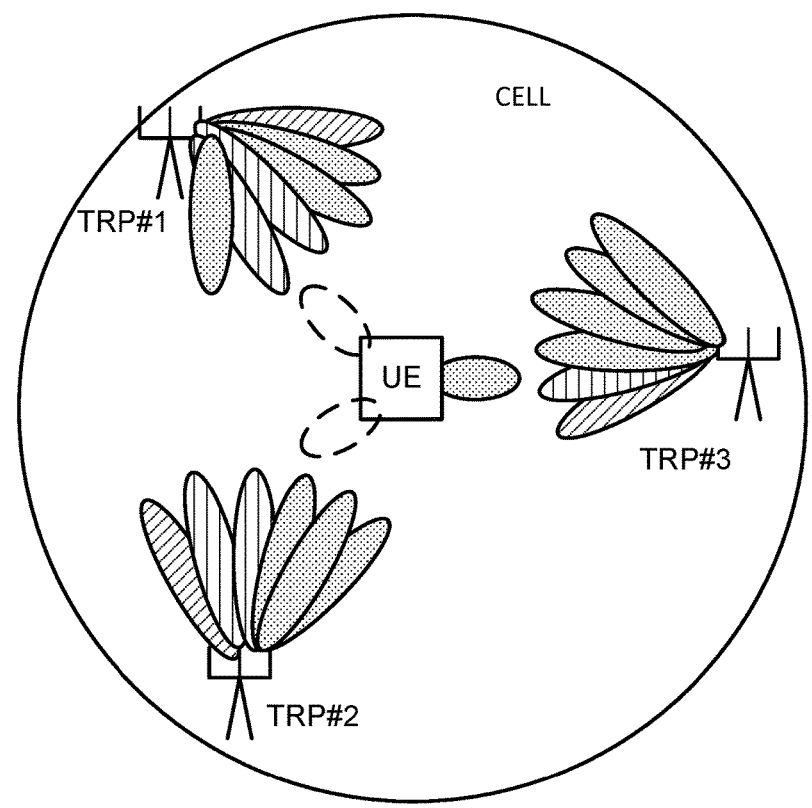
FIG. 14 is a diagrammatic view showing an example relationship between cell, transmission and reception point (TRP), and beam.

FIG. 5D shows example, basic, non-limiting acts or steps performed by radio access node 22 of FIG. 3D according to the foregoing example. Act 5D-1 comprises the radio access node 22B generating a switch timer expiration value. Act 5D-2 comprises the node transmitter circuitry transmitting the switch timer expiration value to the wireless terminal over the air interface. As explained above, the switch timer expiration value is configured to initialize a switch timer of the wireless terminal so that, upon the switch timer reaching the switch timer expiration value, the wireless terminal is prompted to change from using the previous synchronization information periodicity value to using the update synchronization information periodicity value.

In some example embodiments and modes the wireless terminal is configured to change back from using the second synchronization information periodicity value to using the first synchronization information periodicity value upon occurrence of a second predetermined event. In an example implementation, the second predetermined event may be a (second) signal from the radio access network, such as is understood from FIG. 3C. In another example implementation, which is a modification of the example embodiment and mode of FIG. 3D, the wireless terminal 26E is provided with a second timer, e.g., switch back timer 96. In the FIG. 3E example implementation the wireless terminal is configured to change back from using the second synchronization information periodicity value to using the first synchronization information periodicity value upon occurrence of a second predetermined event in the form of expiration of the switch back timer 96. The switch back timer 96 may be loaded with a second timer initialization value, which may be the measure of count up or count down. The switch back timer 96 may start counting upon expiration of a first counter, e.g., periodicity value switch timer 90. After expiration of the switch back timer 96 is detected or signaled, the terminal periodicity value selector 58 switches back from using the second synchronization information periodicity value for the synchronization signal detection to using the first synchronization information periodicity value for the detection.

Figure 3E:
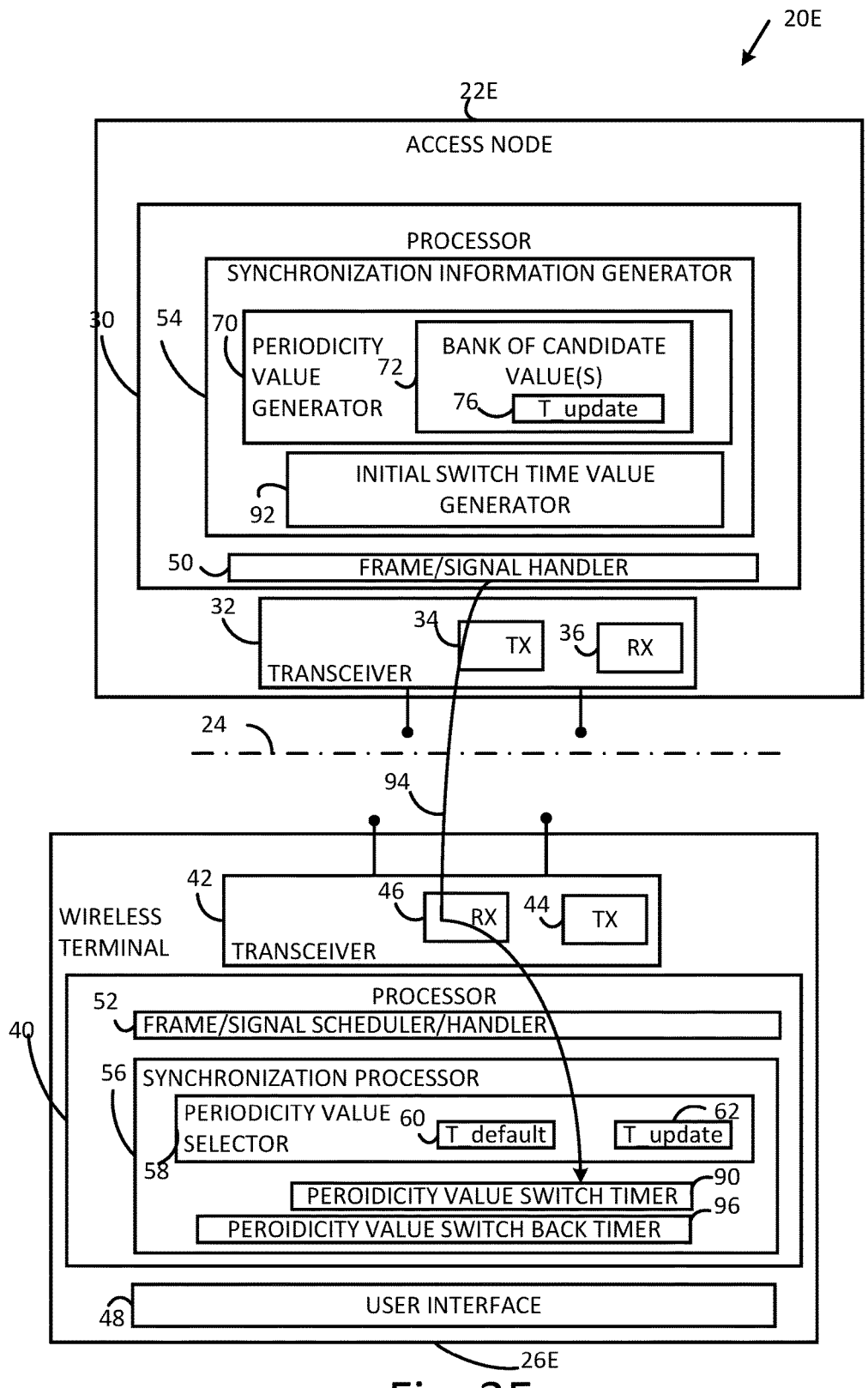
Figure 4E:
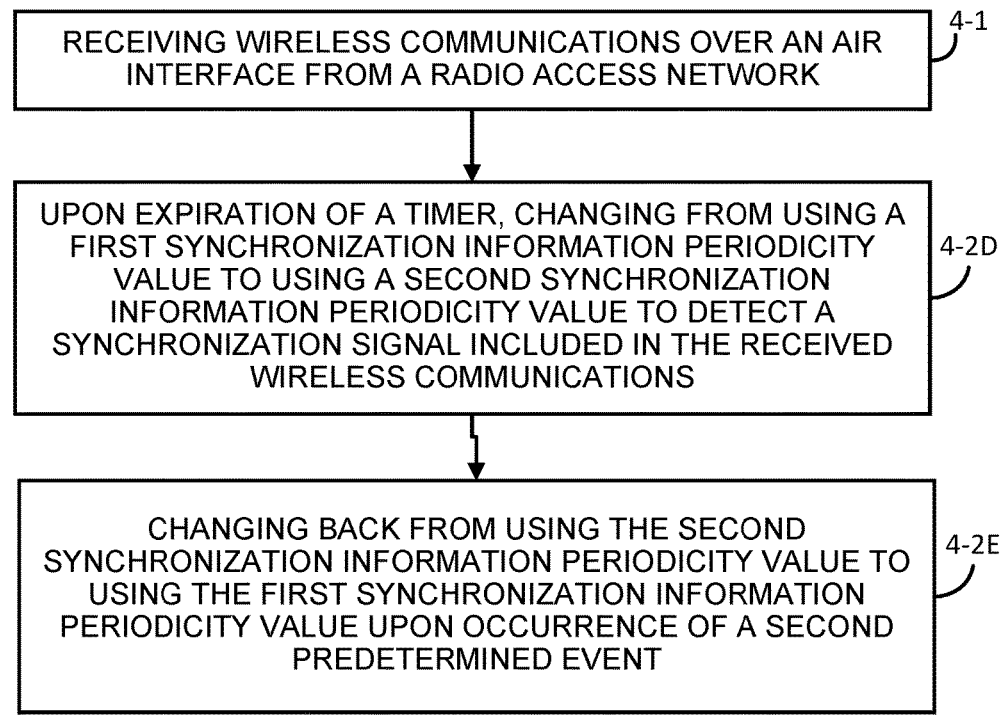

FIG. 4E shows example, basic, non-limiting acts or steps performed by wireless terminal 26E of FIG. 3E. Act 4-1 and act 4-2D of FIG. 4E is the same as act 4-1 and act 4-2D of FIG. 4D. However, act 4-2E of FIG. 4E comprises changing back from using the second synchronization information periodicity value to using the first synchronization information periodicity value upon occurrence of a second predetermined event.

FIG. 5D shows example, basic, non-limiting acts or steps performed by radio access node 22 of FIG. 3D according to the foregoing example. Act 5D-1 comprises the radio access node 22B generating a switch timer expiration value. Act 5D-2 comprises the node transmitter circuitry transmitting the switch timer expiration value to the wireless terminal over the air interface. As explained above, the switch timer expiration value is configured to initialize a switch timer of the wireless terminal so that, upon the switch timer reaching the switch timer expiration value, the wireless terminal is prompted to change from using the previous synchronization information periodicity value to using the update synchronization information periodicity value.

In some example embodiments and modes, such as that shown in FIG. 3B, the radio access node 22B may select the node-selected update synchronization information periodicity value 76 from multiple values comprising the bank 72. The wireless terminal 26 likely does not have previous knowledge of the multiple values in bank 72, and does not necessarily know which of the multiple candidate values the radio access node 22 will select for the node-selected update synchronization information periodicity value 76. So the radio access node 22B includes the node-selected update synchronization information periodicity value 76 in the signal 74. The signal 74 may be broadcast signaling and/or dedicated signaling to a CONNECTED mode UE, or included in broadcast signaling to an IDLE mode UE.

Figure 3F:
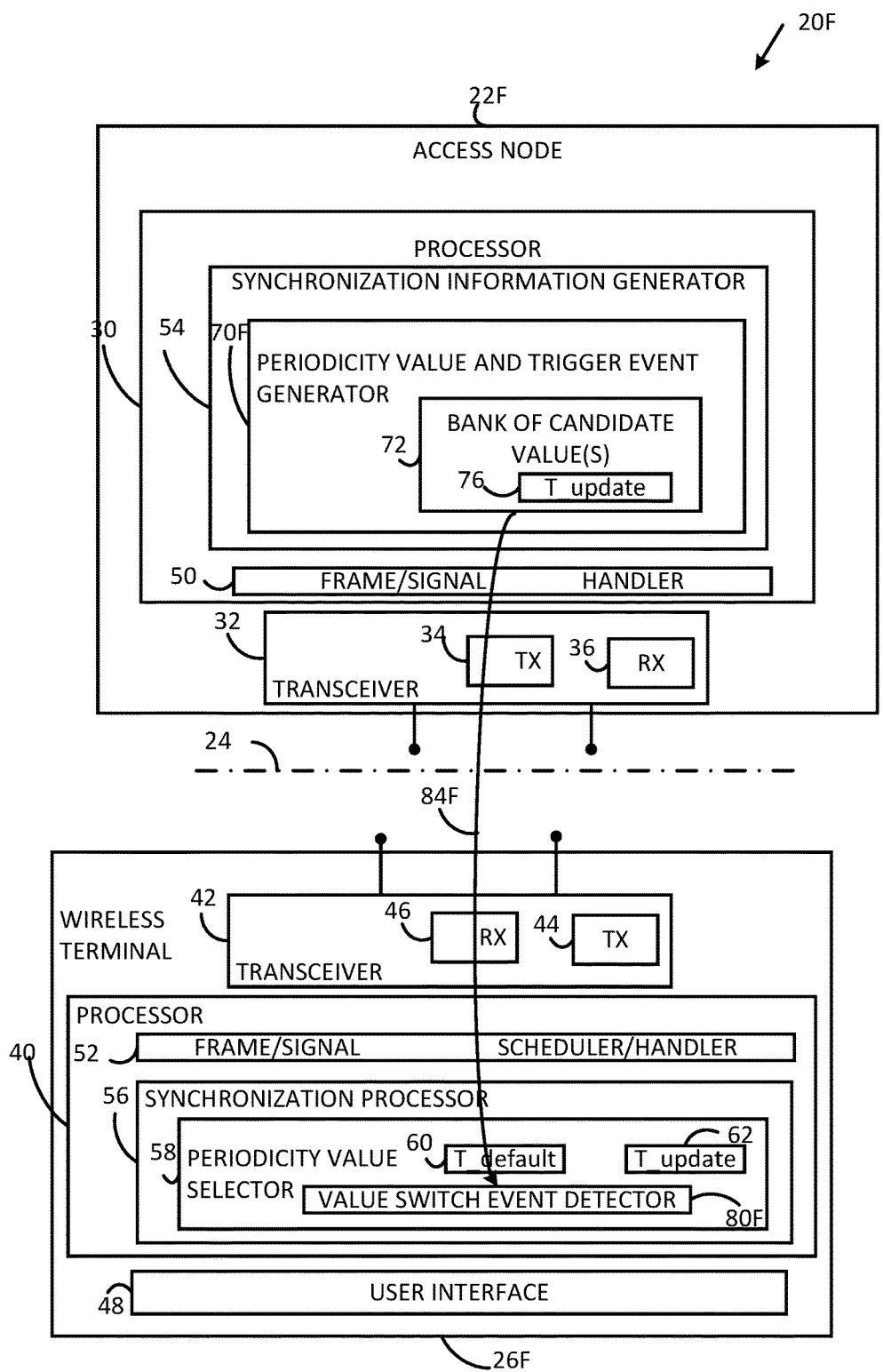

FIG. 3F illustrates yet another example embodiment and mode in which receipt of the signal 74 including the node-selected update synchronization information periodicity value 76 not only supplies the second synchronization information periodicity value, but also serves as the triggering event to cause the terminal periodicity value selector 58 to change from the first synchronization information periodicity value to the second synchronization information periodicity value. In the FIG. 3F example embodiment and mode, the synchronization information periodicity value generator 70F serves as a combined synchronization information periodicity value generator and trigger event signal generator, such that transmission of the node-selected update synchronization information periodicity value 76 in signal 74F serves as the trigger event. The terminal periodicity value switch event detector 80F of wireless terminal 26F, upon detection of receipt of the trigger event signal generator 84F, uses such signal receipt to initiate the change from use of the first synchronization information periodicity value to the second synchronization information periodicity value.

The foregoing example embodiments and modes illustrate certain example situations including update of synchronization information periodicity value (e.g., SSBSP) by a network. The foregoing example embodiments and modes encompass but are not limited to the following alternative detailed designs:

Alt A. For a given carrier frequency, besides T_default, there is another SSBSP defined (T_update). The value of T_update could be either pre-defined, or configured by network from a set of SSBSP values.

Alt A.1> When T_update is pre-defined, the value of T_update can also be known by the UE, so it is not necessarily to be signaled to the UE by gNB; instead, some events may trigger the UE to detect SS/SS burst set with the updated periodicity. The following review some examples of "events":

Example 1: There is an one bit information element (IE) included in the broadcast signaling and/or dedicated signaling to the CONNECTED mode UE, or in the broadcast signaling to the IDLE mode UE, indicating the current SSBSP is T_default or T_update, e.g., "0" represents T_default and "1" represents T_update.

Example 2: There is a timer configured to the UE through broadcast signaling and/or dedicated signaling for the duration to use default SSBSP; the expiry of the timer indicates the UE should use the updated SSBSP to detect SS. In this case, there might be another timer configured in the same way to the UE for the duration to use update SSBSP; the expiry of the timer indicates the UE should use the default SSBSP.

Alt A.2> When T_update is configured by the network from multiple values, the UE doesn't have the a priori knowledge of the SSBSP value. In this case, there is a value included in the broadcast signaling and/or dedicated signaling to the CONNECTED mode UE, or in the broadcast signaling to the IDLE mode UE, indicating the new value of SSBSP. The value itself can trigger the UE to detect SS with the updated SSBSP, or it is possible that this value is combined with the above triggering event, e.g., when the UE is triggered to update SSBSP, it will check the exact value of the new SSBSP.

B. Resolving Use by Networks and Terminals of Differing Synchronization Information Periodicity Values FIG. 2B depicts a situation in which a network has updated the synchronization information periodicity value (SSBSP) from default values to other values, e.g., to an updated synchronization information periodicity value (updated SSBSP), while an initial access stage wireless terminal still assumes that the operative synchronization information periodicity value is the default synchronization information periodicity value (default SSBSP). In particular, in FIG. 2B the radio access node 22 has changed from a default synchronization signal burst set periodicity value (T_default) to an update synchronization signal burst set periodicity value (T_update), but the wireless terminal 26, having recently made access to the network (e.g., to CELL), is still using the default synchronization signal burst set periodicity value.

The example embodiments and modes of FIG. 6A-FIG. 6D address, e.g., the issue or situation shown in FIG. 2B in which a network has updated the synchronization information periodicity value (SSBSP) from default values to other values, e.g., to an updated synchronization information periodicity value (updated SSBSP), while an initial access stage wireless terminal still assumes that the operative synchronization information periodicity value is the default synchronization information periodicity value (default SSBSP). In the example embodiments and modes of FIG. 6A-FIG. 6D, elements which have the same reference numerals as one or more of FIG. 3A-FIG. 3F are understood to have the same structure and/or functionality unless otherwise noted or clear from context.

Figure 6A:
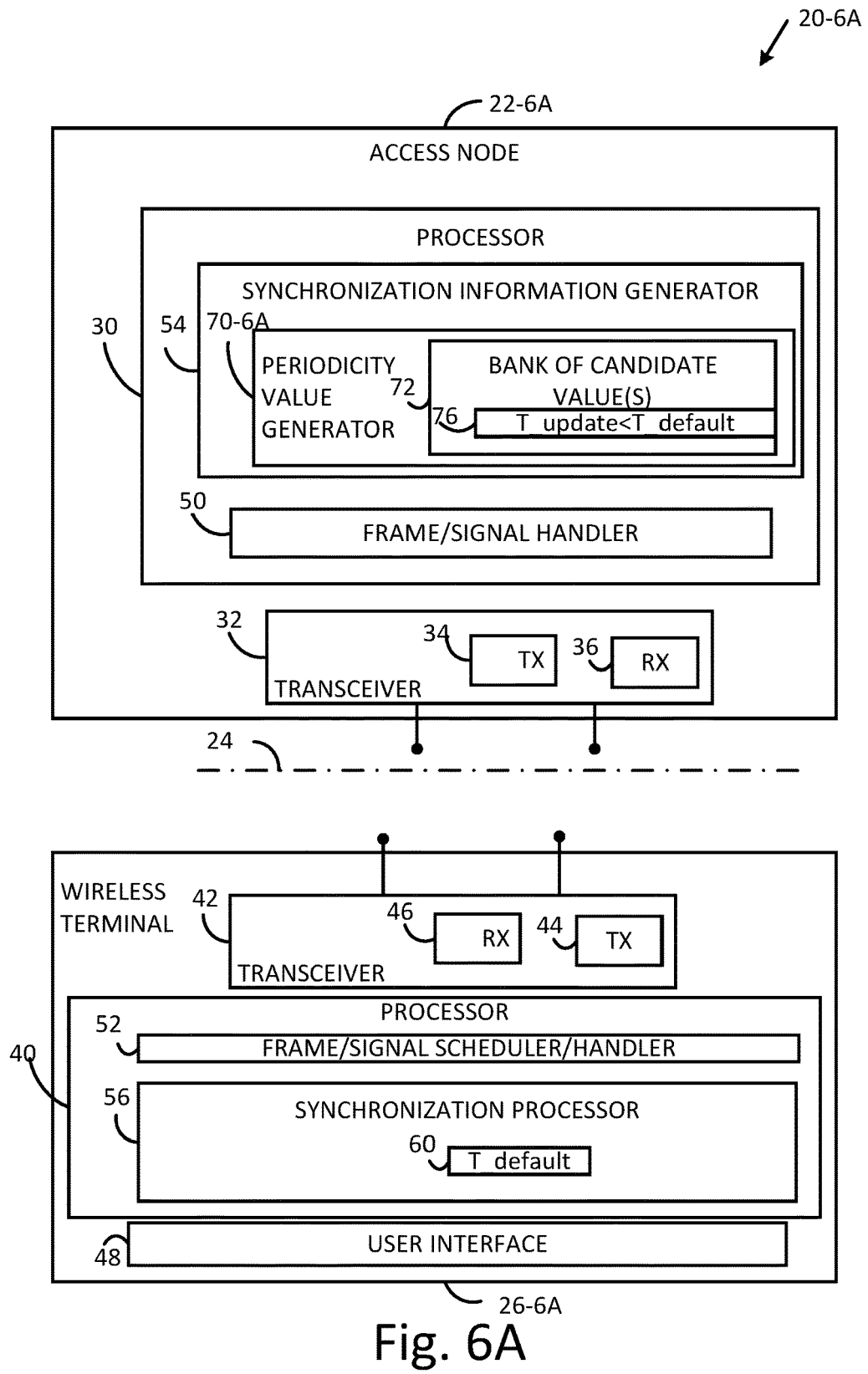

The synchronization information periodicity value generator 70-6A of FIG. 6A, which may be included in synchronization information generator 54, is configured to select an update synchronization information periodicity value which is smaller than a default synchronization information periodicity value of the radio access network. For example, the synchronization information periodicity value generator 70-6A may select updated synchronization information periodicity values (SSBSP values) that are always defined or configured to be smaller than the default SSBSP. For example, synchronization information periodicity value generator 70-6A may have access to a "T_update" information element, which comprises a set of candidate values, and the maximum value in the candidate value range is no larger than the T_default given a carrier frequency. In this case, the network more frequently transmits the synchronization signal. As such the wireless terminal 26-6A, when still using the default SSBSP, may miss detecting some of the synchronization signals. Nevertheless, as a result of the technology disclosed herein, the wireless terminal 26-6A of FIG. 6A may be able to maintain the initial access SS detection performance without significant adverse effect.

Moreover, for the benefit of the wireless terminal 26-6A, and as an optional feature in conjunction with the relatively shorter updated synchronization information periodicity value, the synchronization information generator 54 of radio access node 22-6A may cause the synchronization signal to be transmitted plural times in a synchronization signal detection window corresponding to the default synchronization information periodicity value (since the wireless terminal 26-6A may still believe that the operative synchronization information periodicity value is the default synchronization information periodicity value). Thus, with this optional feature, although the wireless terminal 26-6A may still be operating with the default synchronization information periodicity value rather than the updated synchronization information periodicity value, and although the wireless terminal 26-6A may still be using a synchronization signal detection window corresponding to the default synchronization information periodicity value, the wireless terminal 26-6A has more opportunity to detect the synchronization signal since it is transmitted plural times in the synchronization signal detection window. For the example embodiment and mode of FIG. 6A, in accordance with this optional feature the terminal synchronization processor 56 may be configured to detect plural receptions of the synchronization signal in a detection window corresponding to the default synchronization information periodicity value.

Figure 7A:
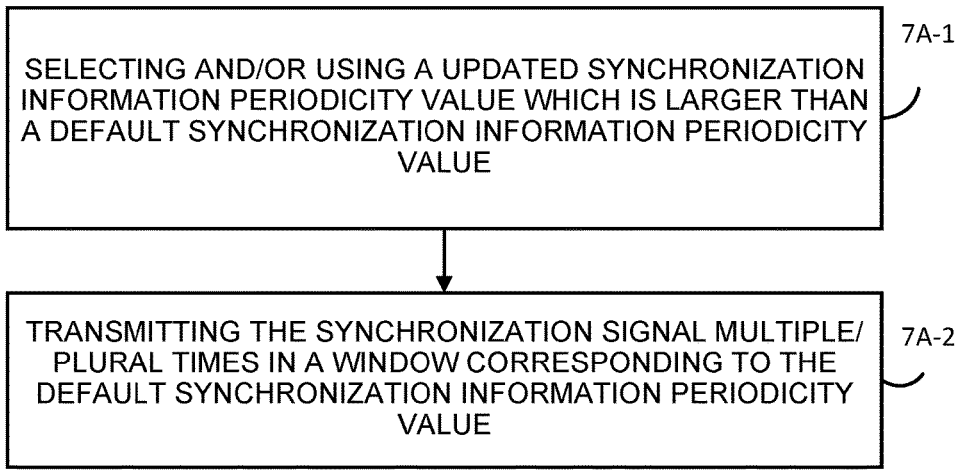

FIG. 7A shows example, representative, non-limiting acts or steps that may be executed or performed by the radio access node 22-6A of FIG. 6A. Act 7A-1 comprises the radio access node 22-6A selecting and/or using a updated synchronization information periodicity value which is smaller than a default synchronization information periodicity value which is assumed and used by the wireless terminal 26-6A. Act 7A-2 comprise the optional act of the radio access node 22-6A transmitting the synchronization signal multiple/plural times in a window corresponding to the default synchronization information periodicity value.

Figure 8A:
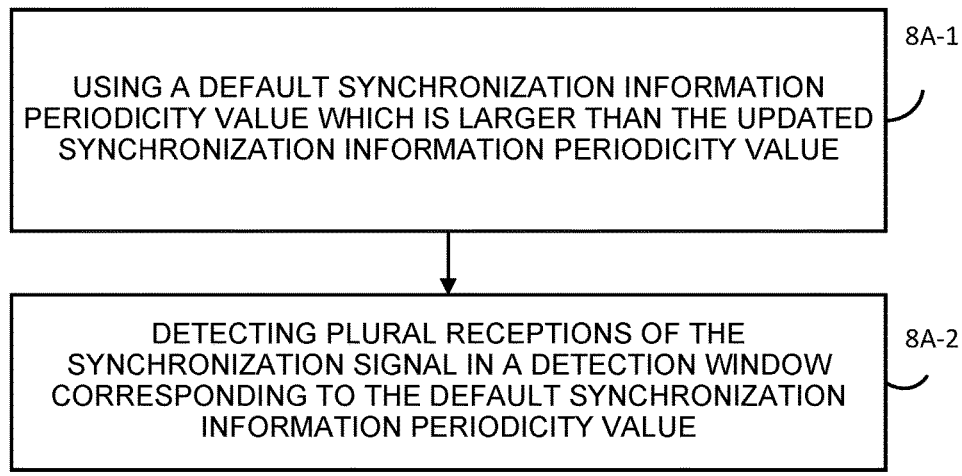

FIG. 8A shows example, representative, non-limiting acts or steps that may be executed or performed by the wireless terminal 26-6A of FIG. 6A. Act 8A-1 comprises the wireless terminal 26-6A using a default synchronization information periodicity value which is larger than the updated synchronization information periodicity value selected by radio access node 22-6A to transmit the synchronization signal. Act 8A-2 comprise the optional act of the wireless terminal 26-6A detecting plural receptions of the synchronization signal in a detection window corresponding to the default synchronization information periodicity value.

Figure 6B:
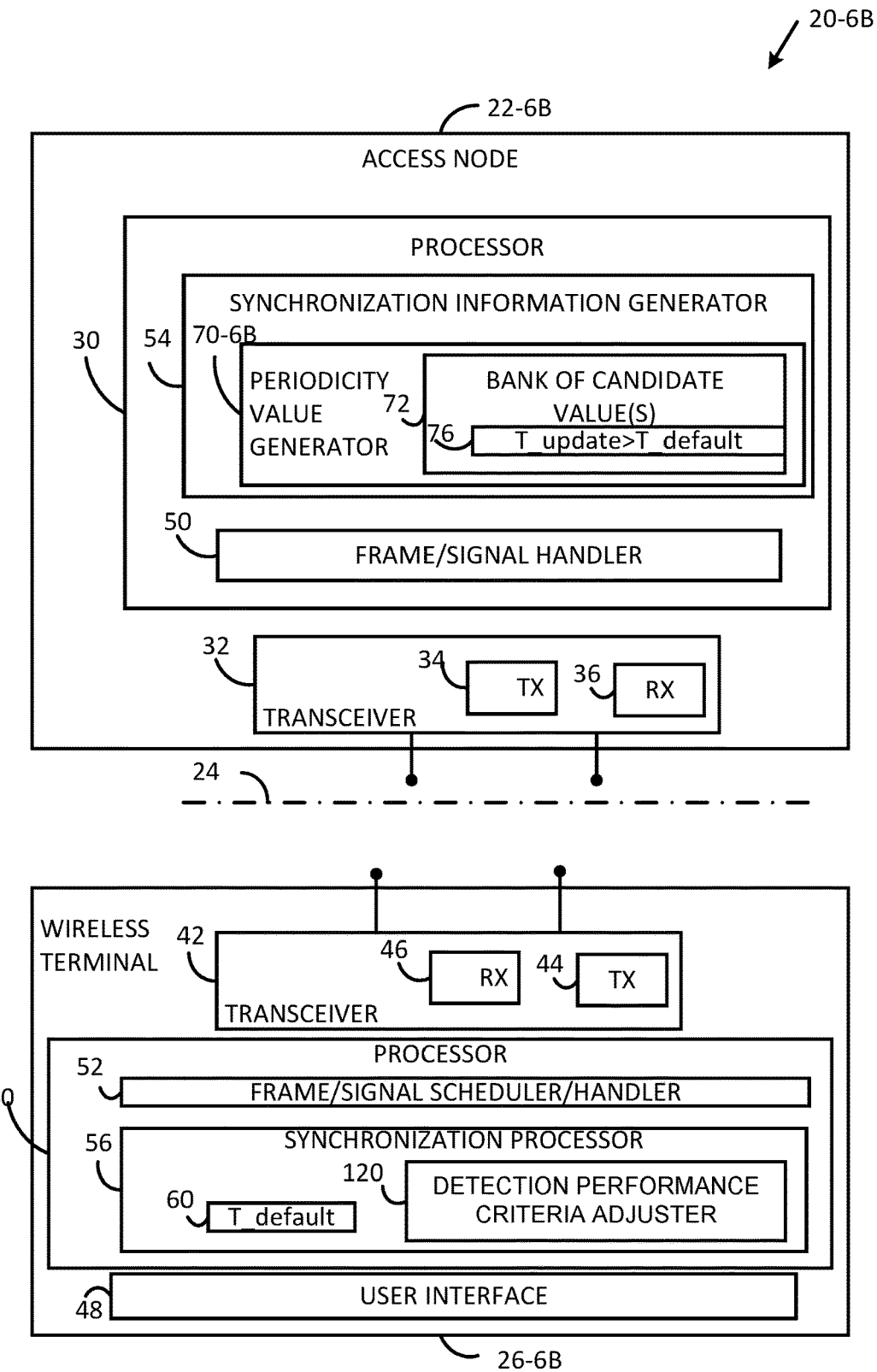

The synchronization information generator synchronization information periodicity value generator 70-6B of FIG. 6B, which may be included in synchronization information generator 54 of the radio access node 22-6B, is configured to select an update synchronization information periodicity value which is larger than a default synchronization information periodicity value of the radio access network. For example, the synchronization information periodicity value generator 70-6B may be configured to select and/or use updated synchronization information periodicity values (updated SSBSP values) that are always defined or configured to be larger than the default synchronization information periodicity value (e.g., larger than the default SSBSP). For example, synchronization information periodicity value generator 70-6B may have access to a "T_update" information element, which comprises a set of candidate values, and the minimum value in the candidate value range is no smaller than the T_default given a carrier frequency. Without accommodation, the wireless terminal 26-6B of FIG. 6B may need more than one default SSBSP to detect the synchronization signal. Needing more than one default SSBSP may affect the initial access detection performance within some predefined time period. But New Radio requires fast initial access, so without accommodation the wireless terminal 26-6B might not wait for a long enough period to accumulate enough detection of synchronization signal energy, in which case without accommodation the wireless terminal 26-6B may fail to finally detect the synchronization signal. As one possible technique, the wireless terminal 26-6B may not be provided with any accommodation for the larger than default synchronization information periodicity value, so that the wireless terminal 26-6B experiences and perhaps tolerates some detection performance loss. In this regard, the terminal synchronization processor 56 may adjust its detection performance criteria in view of the update synchronization information periodicity value relative to the default synchronization information periodicity value. FIG. 6B shows, for example, that the terminal synchronization processor 56-6B may comprise detection performance criteria adjuster 120. The detection performance criteria adjuster 120 may allow a determination of synchronization signal detection using a less stringent criteria in certain situations, such as when the synchronization signal is transmitted with an updated synchronization information periodicity value which is larger than the default synchronization information periodicity value used by the wireless terminal 26-6B. For example, the detection performance criteria adjuster 120 may allow determination of detection of a synchronization signal upon detection of less energy associated with the synchronization signal than would have otherwise been the case.

FIG. 7B shows an example, representative, non-limiting act or step that may be executed or performed by the radio access node 22-6B of FIG. 6B. Act 7B-1 comprises the radio access node 22-6A selecting and/or using a updated synchronization information periodicity value which is smaller than a default synchronization information periodicity value which is assumed and used by the wireless terminal 26-6A.

FIG. 8B shows example, representative, non-limiting acts or steps that may be executed or performed by the wireless terminal 26-6B of FIG. 6B. Act 8B-1 comprises the wireless terminal 26-6B using a default synchronization information periodicity value which is smaller than the updated synchronization information periodicity value selected by radio access node 22-6A to transmit the synchronization signal. Act 8A-2 comprises the wireless terminal 26-2B adjusting detection performance criteria for detecting the synchronization signal using the default synchronization information periodicity value.

The wireless terminal 26-6C shown in FIG. 6C does, however, have some accommodation to the larger-than-default synchronization information periodicity value. For example, the terminal synchronization processor 56 of wireless terminal 26-6B comprises synchronization signal detection performance enhancer 122. The synchronization signal detection performance enhancer 122 may be implemented in several ways. For example, the synchronization signal detection performance enhancer 122 may (in coordination with radio access node 22-6C) may use one type of SS sequence that serves to satisfy both one-shot and multiple-shot SS detection performance requirements. In a one-shot detection scheme, implemented in some wireless terminals, just one detection of a synchronization signal sequence is deemed sufficient for making a final determination of synchronization signal detection. Alternatively, the synchronization signal detection performance enhancer 122 may be implemented by using more than one type of SS sequence design for one-shot and multiple-shot detection respectively, e.g., longer SS sequences with better detection performance are transmitted by the network when the network updates SSBSP to larger values. The wireless terminal 26-6C also has this predetermined information to use different types of sequences for SS detection.

As an example of an enhancement operation that may be performed by synchronization signal detection performance enhancer 122, the synchronization signal detection performance enhancer 122 may modify or change a typical one-shot synchronization signal detection operation into a less-than-maximum shot synchronization signal detection operation. Some synchronization signal detectors require plural detections (e.g., N, where N is an integer>1) of a synchronization signal sequence in a detection window before the synchronization signal detector definitively determines that the synchronization signal has, in fact, been detected. In an example implementation, the synchronization signal detection performance enhancer 122 of FIG. 6C may make a final detection of the synchronization signal upon determination of less than N number of detections in the window for which N number of detections would otherwise have been expected. In other words, in a window in which the terminal synchronization processor 56, using the default synchronization information periodicity value, would have expected to have accumulated Y integer multiples of synchronization signal detection energy, the terminal synchronization processor 56 instead is allowed to accumulate less than Y multiple times the SS detection energy upon receiving the synchronization signal transmitted with the updated synchronization information periodicity value.

FIG. 7C shows an example, representative, non-limiting act or step that may be executed or performed by the radio access node 22-6C of FIG. 6C. Act 7C-1 comprises the radio access node 22-6A selecting and/or using an updated synchronization information periodicity value which is smaller than a default synchronization information periodicity value which is assumed and used by the wireless terminal 26-6A.

FIG. 8C shows example, representative, non-limiting acts or steps that may be executed or performed by the wireless terminal 26-6C of FIG. 6C. Act 8C-1 comprises the wireless terminal 26-6C using a default synchronization information periodicity value which is smaller than the updated synchronization information periodicity value selected by radio access node 22-6A to transmit the synchronization signal. Act 8C-2 comprises the wireless terminal 26-2C enhancing detection performance criteria for detecting the synchronization signal using the default synchronization information periodicity value.

In the scenario of FIG. 8D, the wireless terminal does not perform certain tasks as does the wireless terminal in the scenario of FIG. 8C. In the FIG. 8C scenario, the wireless terminal may have to detect more copies of the synchronization signal within one SS burst set, as the network will configure accordingly.

Figure 6D:
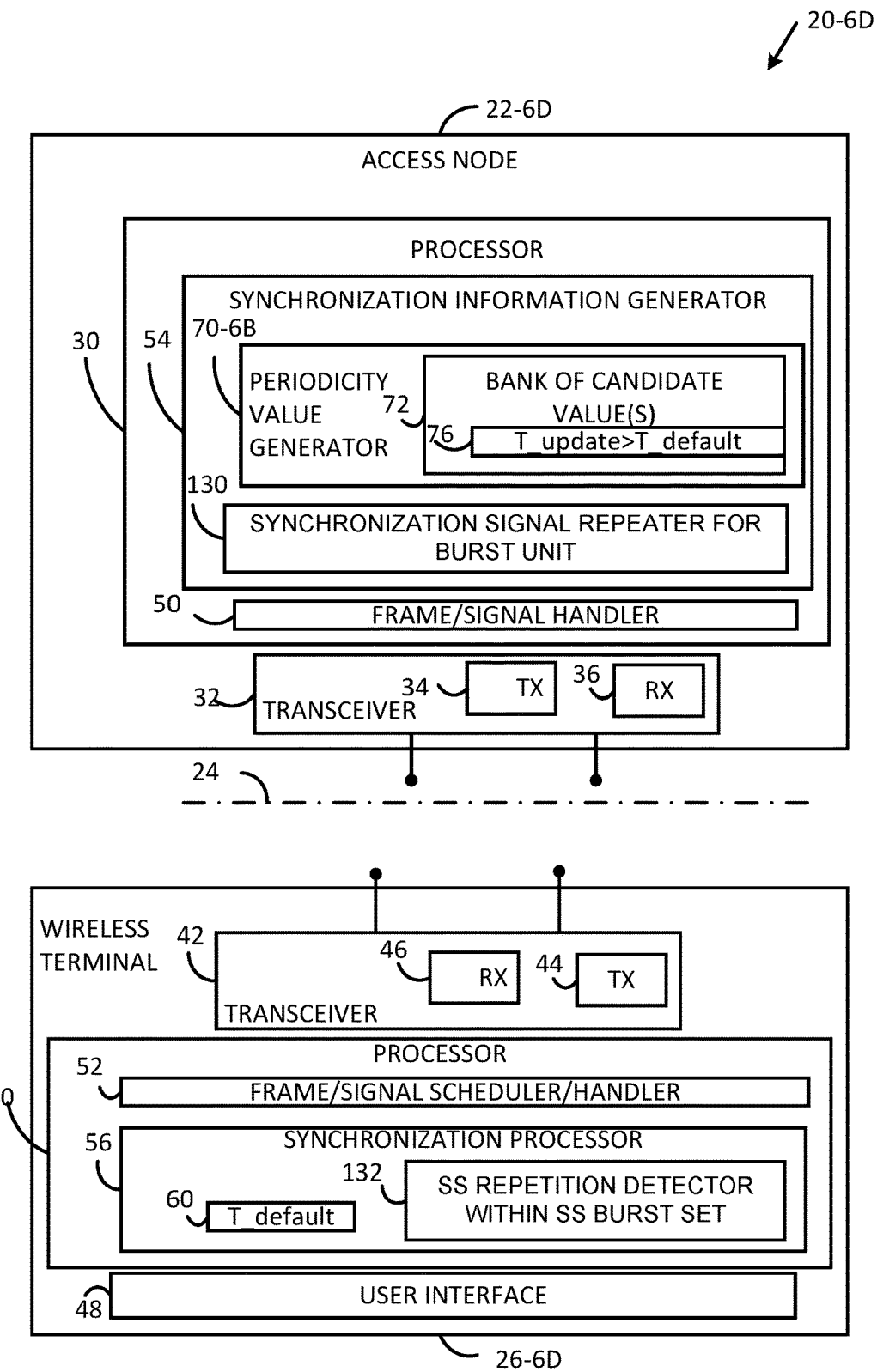

The radio access node 22-6D shown in FIG. 6D also uses or selects an updated synchronization information periodicity value which is larger than the default synchronization information periodicity value. But the radio access node 22-6D offers some accommodation to wireless terminal 26-6D by providing an increased number of repetitions of the synchronization signal in a synchronization signal burst set to facilitate detection by the wireless terminal. In this regard, the synchronization information generator 54 of FIG. 6D is shown as comprising synchronization signal repeater for burst unit 130. Using the synchronization signal repeater for burst unit 130, more repetitions of synchronization signal within one SS burst set are carried for better detection performance within one SS burst set. The wireless terminal 26-6D also has this predetermined information for SS detection within SS burst set. For example, the terminal synchronization processor 56 of wireless terminal 26-6D comprises detector 132 which is configured to detect an increased number of synchronization signal repetitions within a synchronization signal burst set.

In the above regard, concepts of "more" and "increased number" may be understood by the following: Assume with default periodicity, there are X number of copies (x is an integer great than 0, e.g., normally 1) of a synchronization signal within a SS burst set. "More repetitions" means, compared to the default periodicity, there are y copies of synchronization signal, where, Y>X if the update periodicity has larger value than the default one. The repetition number is known to the wireless terminal, e.g., either pre-configured and/or configured to the wireless terminal by the network, e.g., through some indication carried by SS burst set.

FIG. 7D shows an example, representative, non-limiting act or step that may be executed or performed by the radio access node 22-6D of FIG. 6D. Act 7D-1 comprises the radio access node 22-6D selecting and/or using an updated synchronization information periodicity value which is smaller than a default synchronization information periodicity value which is assumed and used by the wireless terminal 26-6D. Act 7D-2 comprises the radio access node 22-6D including plural (more) instances of the synchronization signal in a synchronization signal burst set to facilitate detection by the wireless terminal.

FIG. 8D shows example, representative, non-limiting acts or steps that may be executed or performed by the wireless terminal 26-6D of FIG. 6D. Act 8D-1 comprises the wireless terminal 26-6D using a default synchronization information periodicity value which is smaller than the updated synchronization information periodicity value selected by radio access node 22-6A to transmit the synchronization signal. Act 8D-2 comprises the wireless terminal 26-2D detecting plural (more) instances of the synchronization signal in a synchronization signal burst set to facilitate better detection of the synchronization signal despite using the larger default synchronization information periodicity value.

Variations and combinations of the foregoing example embodiments and modes are encompassed hereby. For example, another example embodiment and mode combines the techniques of FIG. 6C, FIG. 7C, and FIG. 8C with the techniques of FIG. 6D, FIG. 7D, and FIG. 8D. As another variation, the wireless terminal may always use the smallest value periodicity, e.g., 5 ms, for detection.

In the example embodiment and mode of FIG. 6A, the radio access node 22-6A uses an updated synchronization information periodicity value which is smaller than the default synchronization information periodicity value. By contrast, in the example embodiments and modes of FIG. 6B-FIG. 6D, the radio access nodes 22-6B, 22-6C, and 22-6D use an updated synchronization information periodicity value which is larger than the default synchronization information periodicity value. In yet another example embodiment and mode, the radio access node 22 may not be constrained to use just one of a smaller or larger updated synchronization information periodicity value, but may be free in some instances to choose or select a larger updated synchronization information periodicity value and in other instances to choose or select a smaller updated synchronization information periodicity value. In such example embodiment and mode, the wireless terminal still always uses the default synchronization information periodicity value (e.g., default SSBSP) to detect the synchronization signal. If the wireless terminal 26 can always detect SS burst set within default SSBSP, there is no problem, as it means the actual SSBSP periodicity is at least no larger than UE's assumption. Otherwise, the UE knows the SSBSP value is smaller than the default SSBSP, and in such case the techniques of one or more of FIG. 6B-FIG. 6D may be utilized.

C. Wireless Terminals Acquiring Synchronization Information Periodicity Values for Neighboring Cells In some situations a wireless terminal needs to know the default synchronization signal burst set periodicity value of a neighboring cell. For example, as simply illustrated in FIG. 2C, the wireless terminal WT may prepare for a handover from an existing cell in which it presently resides (e.g., $CELL_1$) to a neighboring cell ($CELL_2$). The default synchronization signal burst set periodicity value of the neighboring cell $CELL_2$ may be different from the existing cell $CELL_1$. For example, FIG. 2C shows that the default synchronization signal burst set periodicity value (e.g., SSBSP) for $CELL_1$ is $T\_default_1$, while the default synchronization signal burst set periodicity value for $CELL_2$ is $T\_default_2$. The default synchronization signal burst set periodicity value of the neighboring cell may differ in the case that the neighboring cell uses different carrier frequency(ies) (e.g., an inter-frequency change), or even in the situation in which the neighboring cell uses the same carrier frequency(ies) (intra-frequency situation).

Figure 9:
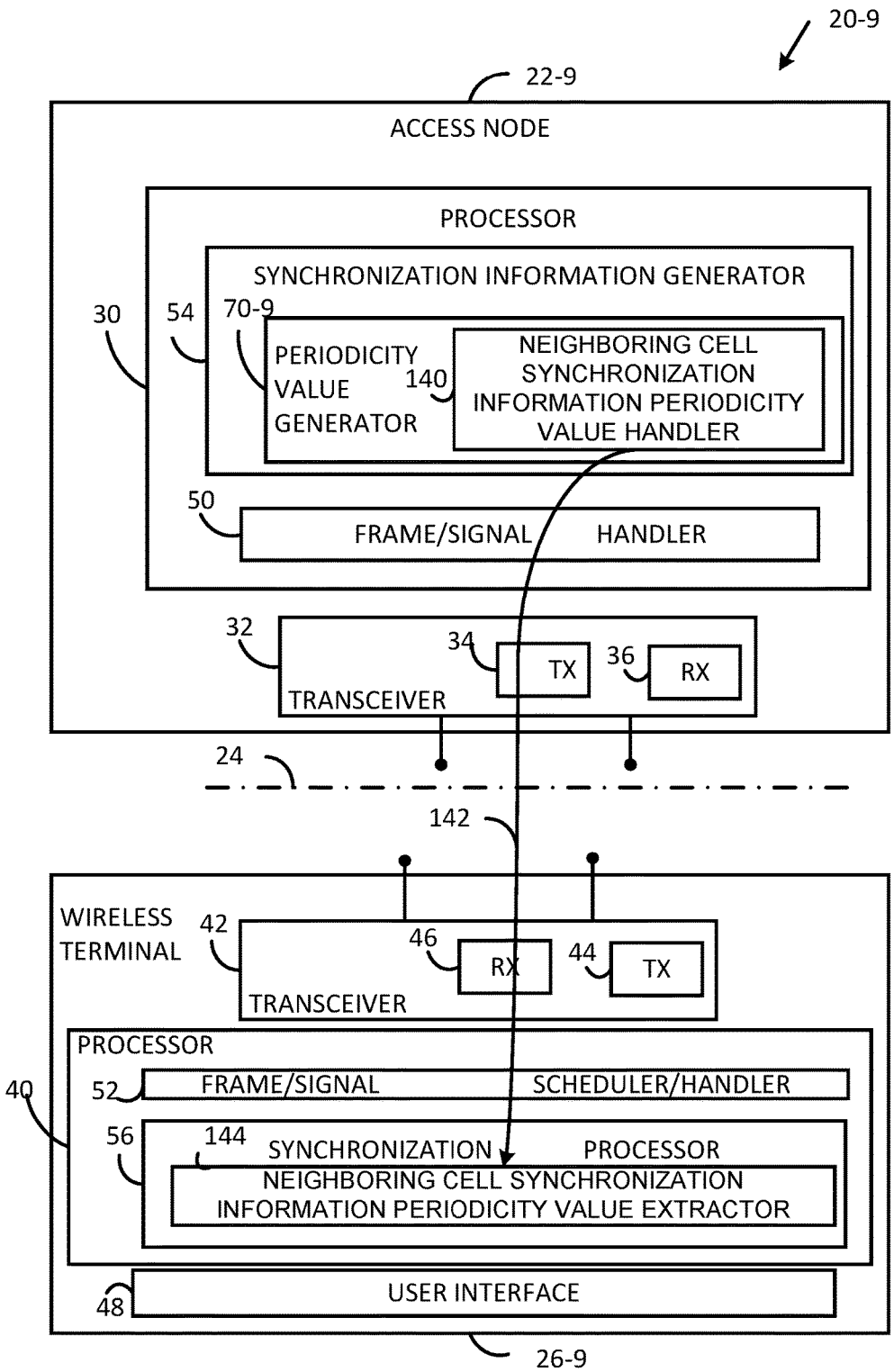
FIG. 9 is a schematic view showing example communications systems comprising a radio access nodes and a wireless terminal, and wherein a wireless terminal seeks to obtain a synchronization information periodicity value for a neighboring cell.

Described below with reference to FIG. 9 is an example, non-limiting system in which a wireless terminal attempt to obtain, from the wireless communications of the radio access network, a synchronization information periodicity value for use in a synchronization signal detection process relative to a neighboring cell. In the example embodiments and modes of FIG. 9, elements which have the same reference numerals as one or more of FIG. 3A-FIG. 3F are understood to have the same structure and/or functionality unless otherwise noted or clear from context.

In the example embodiment and mode of FIG. 9, the synchronization information generator 54 of radio access node 22-9A comprises neighboring cell synchronization information periodicity value handler 140. The neighboring cell synchronization information periodicity value handler 140 obtains the default synchronization signal burst set periodicity value of the neighboring cell(s), such as $CELL_2$ of FIG. 2C, and includes the default synchronization signal burst set periodicity value of the neighboring cell(s) in signaling (depicted by arrow 142) to be sent to wireless terminal 26-9A. The default synchronization signal burst set periodicity value (e.g., default SSBSP) of neighboring cell(s) such as $CELL_2$ may be indicated to wireless terminal 26-9A in signaling such as broadcast signaling and/or dedicated signaling if the wireless terminal 26-9A is in the CONNECTED mode, or in broadcast signaling if the wireless terminal 26-9A is in the IDLE mode UE. The default synchronization signal burst set periodicity value for the neighboring cell may be included in the signaling 142 in a similar manner as in a system information block (SIB) of the LTE system, e.g., in a similar manner as in system information block SIBS of the LTE system.

FIG. 9 further shows that the terminal processor circuitry 40 is configured to obtain the synchronization information periodicity value for the neighboring cell from a signal transmitted by the radio access network, e.g., transmitted by radio access node 22-9A. The terminal processor circuitry 40 of the wireless terminal 26-9A particularly comprises neighboring cell synchronization information periodicity value extractor 144. The default synchronization signal burst set periodicity value for the neighboring cell carried by the signal 142 is received by the receiver circuitry 46 of wireless terminal 26-9A, decoded by fame handler 52 from the frame in which the signal 142 is formatted, and then accessed by neighboring cell synchronization information periodicity value extractor 144. Thereafter the wireless terminal 26-9A may use the default synchronization signal burst set periodicity value of the neighboring cell (e.g., $T\_default_2$ in FIG. 2C) in conjunction with a synchronization signal detection procedure relative to wireless communications received from the neighboring cell (e.g., $CELL_2$ in FIG. 2C).

In an example implementation illustrated in FIG. 12A, the signaling 142 which includes the default synchronization signal burst set periodicity value of the neighboring cell(s) comprises a neighboring cell list 150. As shown in FIG. 12A, the neighboring cell list may take the form of a table which comprises a default synchronization information periodicity value (T_default) for each neighboring cell included in the list. FIG. 12A shows the table comprising neighboring cell list 150 as including a first column of entries which lists each neighboring cell, and a second column of entries in which entries of the same row correspond to the default synchronization signal burst set periodicity value for the associated neighboring cell.

FIG. 12B shows that the neighboring cell list may be modified in a manner to include not only the default synchronization signal burst set periodicity value for the neighboring cells, but also an update synchronization signal burst set periodicity value for the neighboring cells. In the particular implementation of the neighboring cell list 150' shown in FIG. 12B, a third column which shows the update synchronization signal burst set periodicity value for the neighboring cell of the associated row is provided.

The neighboring cell list 150 of FIG. 12A and/or the neighboring cell list 150' of FIG. 12B may be either a table indicating the inter-frequency neighboring cell list, or a table indicating the intra-frequency neighboring cell list.

The neighboring cell list which includes the default synchronization signal burst set periodicity value for the neighboring cell may thus be in signaling such as the table of the neighboring cell list 150 of FIG. 12A or the neighboring cell list 150' of FIG. 12B, or instead may in be dedicated signaling to a particular wireless terminal 26-9A.

For the example embodiment and mode of FIG. 9, if the wireless terminal 26-9A is not able to obtain the default synchronization signal burst set periodicity value for the neighboring cell, the wireless terminal 26-9 may use the smallest synchronization information periodicity value, which is in some example implementations 5 milliseconds.

Thus, for the example embodiment and mode of FIG. 9, the neighboring cell may be configured with different default SSBSP values. There are two alternative cases for the FIG. 9 scenario. In the first case, Alt C.1, the default SSBSP of neighboring cells are indicated to the UE in the broadcast signaling and/or dedicated signaling to the CONNECTED mode UE, or in the broadcast signaling to the IDLE mode UE. As one example, in the NR-SIB information broadcasting inter-frequency NR cell information, e.g., similar as SIB 5 in LTE system, there is a table indicating the inter-frequency neighboring cell list, and the corresponding default SSBSP (there is possibility that possible update SSBSP can also be indicated, if Alt A.1 situation occurs), through which the UE knows what default SSBSP is used in inter-frequency neighboring cell(s). There could be similar intra-frequency neighboring cell SSBSP information included in relevant NR-SIB information. Such table information can also be included in the dedicated signaling to some particular UEs. In a second case, Alt C.2, if the wireless terminal (UE) cannot know the neighboring cells SSB information, the UE always uses smallest SSBSP, e.g., 5 ms, to detect SS.

Figure 10:
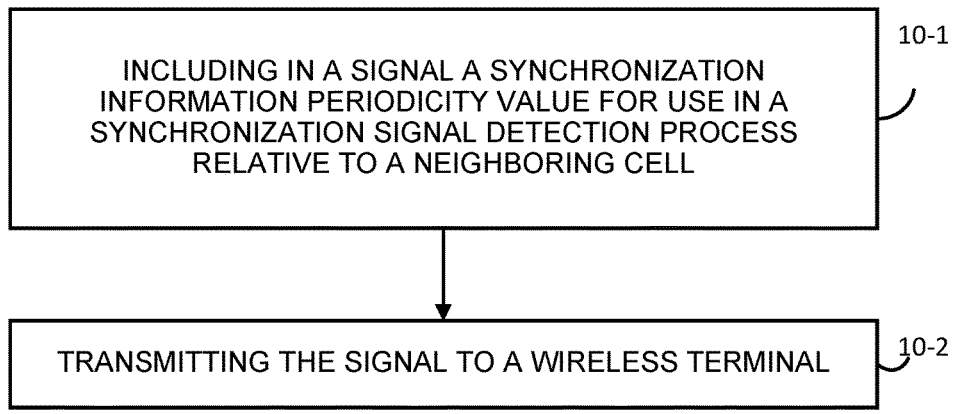
FIG. 10 is a flowchart showing example, non-limiting, representative acts or steps performed by the network node of the system of FIG. 9.

FIG. 10 shows example, representative, non-limiting acts or steps that may be executed or performed by the radio access node 22-9 of FIG. 9. Act 10-1 comprises the synchronization information generator 54 including in a signal a synchronization information periodicity value for use in a synchronization signal detection process relative to a neighboring cell. Act 10-2 comprises transmitting the signal over an air interface to a wireless terminal. FIG. 9 shows transmission of the default synchronization signal burst set periodicity value for the neighboring cell in signal 142.

Figure 11:
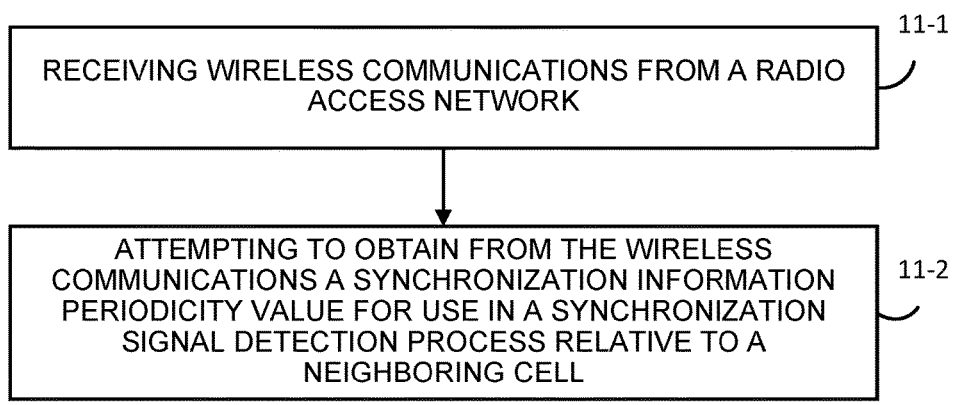
FIG. 11 is a flowchart showing example, non-limiting, representative acts or steps performed by the wireless terminal of the system of FIG. 9.

FIG. 11 shows example, representative, non-limiting acts or steps that may be executed or performed by the wireless terminal 26-9 of FIG. 9. Act 11-1 comprises receiving wireless communications over an air interface from a radio access network. Act 11-2 comprises attempting to obtain from the wireless communications a synchronization information periodicity value for use in a synchronization signal detection process relative to a neighboring cell. As explained above, the default synchronization signal burst set periodicity value for the neighboring cell may be obtained from signaling 142 transmitted from the radio access node 22-9, which may be in the form of a neighboring cell list. If the wireless terminal 26-9 is not able to obtain the default synchronization signal burst set periodicity value for the neighboring cell, the wireless terminal 26-9 may use a smallest known default synchronization signal burst set periodicity value for the default synchronization signal burst set periodicity value for the neighboring cell.

Figure 13:
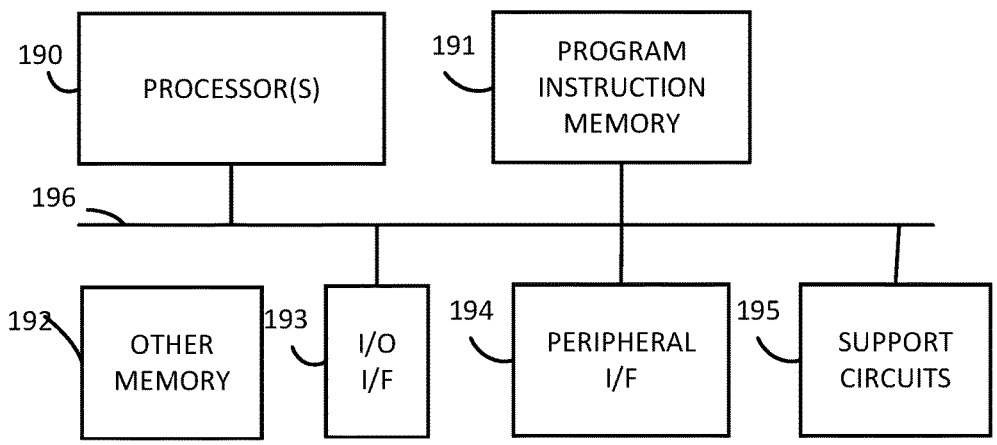
FIG. 13 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 13. FIG. 13 shows an example of such electronic machinery or circuitry, whether node or terminal, as comprising one or more processor(s) circuits 190, program instruction memory 191; other memory 192 (e.g., RAM, cache, etc.); input/output interfaces 193; peripheral interfaces 194; support circuits 195; and busses 196 for communication between the aforementioned units.

The program instruction memory 191 may comprise coded instructions which, when executed by the processor(s), perform acts including but not limited to those described herein. Thus is understood that each of node processor 30 and terminal processor 40, for example, comprise memory in which non-transient instructions are stored for execution.

The memory, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 195 may be coupled to the processors 190 for supporting the processor in a conventional manner. These circuits include cache, power supplies, clock circuits, input/output circuitry and subsystems, and the like.

The technology disclosed herein thus encompasses the following non-limited, example embodiments:

Example Embodiment 1

In one of its example aspects the technology disclosed herein concerns a wireless terminal comprising receiver circuitry and processor circuitry. The receiver circuitry is configured to receive wireless communications over an air interface from a radio access network. The processor circuitry is configured to change from using a first synchronization information periodicity value to using a second synchronization information periodicity value to detect a synchronization signal included in the received wireless communications.

Example Embodiment 2

The wireless terminal of Example Embodiment 1, wherein the first synchronization information periodicity value is a default synchronization information periodicity value and the second synchronization information periodicity value is an update synchronization information periodicity value.

Example Embodiment 3

The wireless terminal of Example Embodiment 1, wherein the second synchronization information periodicity value is pre-configured at the wireless terminal.

Example Embodiment 4

The wireless terminal of Example Embodiment 1, wherein the second synchronization information periodicity value is signaled to the wireless terminal from the radio access network.

Example Embodiment 5

The wireless terminal of Example Embodiment 1, wherein the processor circuitry configured to change from using the first synchronization information periodicity value to using the second synchronization information periodicity value upon occurrence of a predetermined event.

Example Embodiment 6

The wireless terminal of Example Embodiment 5, wherein the predetermined event comprises receipt of a switch signal from the radio access network.

Example Embodiment 7

The wireless terminal of Example Embodiment 5, wherein the predetermined event comprises expiration of a switch timer.

Example Embodiment 8

The wireless terminal of Example Embodiment 7, wherein an expiration value of the switch timer is maintained at the wireless terminal.

Example Embodiment 9

The wireless terminal of Example Embodiment 7, wherein an expiration value of switch timer is received by the wireless terminal in a signal from radio access network Example Embodiment 10

The wireless terminal of Example Embodiment 5, wherein the processor circuitry configured to change back from using the second synchronization information periodicity value to using the first synchronization information periodicity value upon occurrence of a second predetermined event.

Example Embodiment 11

The wireless terminal of Example Embodiment 10, wherein the processor circuitry is configured: to change from using the first synchronization information periodicity value to using the second synchronization information periodicity value upon expiration of a first timer; to change from using the second synchronization information periodicity value to using the first synchronization information periodicity value upon expiration of a second timer.

Example Embodiment 12

The wireless terminal of Example Embodiment 5, wherein the predetermined event is receipt by the wireless terminal of the second synchronization information periodicity value from the radio access network.

Example Embodiment 13

A method in a wireless terminal comprising: receiving wireless communications over an air interface from a radio access network; in a synchronization signal detection process performed by processor circuitry, changing from using a first synchronization information periodicity value to using a second synchronization information periodicity value to detect a synchronization signal included in the received wireless communications.

Example 14

The method of Embodiment 13, wherein the first synchronization information periodicity value is a default synchronization information periodicity value and the second synchronization information periodicity value is an update synchronization information periodicity value.

Example Embodiment 15

The method of Example Embodiment 13, wherein the second synchronization information periodicity value is pre-configured at the wireless terminal.

Example Embodiment 16

The method of Example Embodiment 13, further comprising receiving the second synchronization information periodicity value in a signal from the radio access network Example Embodiment 17

The method of Example Embodiment 13, changing from using the first synchronization information periodicity value to using the second synchronization information periodicity value upon occurrence of a predetermined event.

Example Embodiment 18

The method of Example Embodiment 17, wherein the predetermined event comprises receipt of a switch signal from the radio access network.

Example Embodiment 19

The method of Example Embodiment 17, wherein the predetermined event comprises expiration of a switch timer.

Example Embodiment 20

The method of Example Embodiment 19, further comprising maintaining the expiration value of the switch timer at the wireless terminal.

Example Embodiment 21

The method of Example Embodiment 19, receiving the expiration value of the switch timer from the radio access network.

Example Embodiment 22

The method of Example Embodiment 17, further comprising changing back from using the second synchronization information periodicity value to using the first synchronization information periodicity value upon occurrence of a second predetermined event.

Example Embodiment 23

The method of Example Embodiment 22, further comprising: changing from using the first synchronization information periodicity value to using the second synchronization information periodicity value upon expiration of a first timer; and then changing from using the second synchronization information periodicity value to using the first synchronization information periodicity value upon expiration of a second timer.

Example Embodiment 24

The method of Example Embodiment 13, wherein the predetermined event is receipt by the wireless terminal of the second synchronization information periodicity value from the radio access network.

Example Embodiment 25

A node of a radio access network comprising: processor circuitry configured to select an update synchronization information periodicity value for use in transmitting synchronization signal information; transmitter circuitry configured to transmit the update synchronization information periodicity value and the synchronization signal information over an air interface to a wireless terminal served by the node.

Example Embodiment 26

The node of Embodiment 25, wherein the processor circuitry is configured to generate a switch signal to request that the wireless terminal change from using a previous synchronization information periodicity value to using the update synchronization information periodicity value in conjunction with a synchronization signal detection process; and wherein the transmitter circuitry is configured to transmit the switch signal to the wireless terminal.

Example Embodiment 27

The node of Example Embodiment 26, wherein the processor circuitry is configured to generate the update synchronization information periodicity value as the switch signal.

Example Embodiment 28

The node of Example Embodiment 26, wherein the processor circuitry is configured to generate a switch timer expiration value and the transmitter circuitry is configured to transmit the switch timer expiration value to the wireless terminal over the air interface, and wherein the switch timer expiration value is configured to initialize a switch timer of the wireless terminal, the switch timer upon reaching the switch timer expiration value prompting the wireless terminal to change from using the previous synchronization information periodicity value to using the update synchronization information periodicity value.

Example Embodiment 29

The node of Example Embodiment 25, wherein the processor circuitry is configured to select the update synchronization information periodicity value to be smaller than a default synchronization information periodicity value of the radio access network; and wherein the processor circuitry is configured to cause the synchronization signal to be transmitted plural times in a synchronization signal detection window corresponding to the default synchronization information periodicity value.

Example Embodiment 30

The node of Example Embodiment 25, wherein the processor circuitry is configured to select the update synchronization information periodicity value to be larger than a default synchronization information periodicity value of the radio access network.

Example Embodiment 31

The node of Example Embodiment 30, wherein the processor circuitry is configured to select, for use as the synchronization signal, a synchronization signal sequence that has a length which facilitates less than maximum-shot detection by the wireless terminal.

Example Embodiment 32

The node of Example Embodiment 30, wherein the processor circuitry is configured to repeat the synchronization signal in a synchronization signal burst set to facilitate detection by the wireless terminal.

Example Embodiment 33

The node of Example Embodiment 30, wherein the processor circuitry is configured: to select, for use as the synchronization signal, a synchronization signal sequence that has a length which facilitates less than maximum-shot detection by the wireless terminal; and to repeat the synchronization signal in a synchronization signal burst set to facilitate detection by the wireless terminal.

Example Embodiment 34

A method in a node of a radio access network comprising: selecting an update synchronization information periodicity value for use in transmitting synchronization signal information; transmitting the update synchronization information periodicity value and the synchronization signal information over an air interface to a wireless terminal served by the node.

Example Embodiment 35

The method of Example Embodiment 34, further comprising: generating a switch signal to request that the wireless terminal change from using a previous synchronization information periodicity value to using the update synchronization information periodicity value in conjunction with a synchronization signal detection process; and transmitting the switch signal to the wireless terminal.

Example Embodiment 36

The method of Example Embodiment 35, further comprising generating the update synchronization information periodicity value as the switch signal.

Example Embodiment 37

The method of Example Embodiment 35, further comprising generating a switch timer expiration value and transmitting the switch timer expiration value to the wireless terminal over the air interface, and the switch timer expiration value being configured to initialize a switch timer of the wireless terminal, the switch timer upon reaching the switch timer expiration value prompting the wireless terminal to change from using the previous synchronization information periodicity value to using the update synchronization information periodicity value.

Example Embodiment 38

The method of Example Embodiment 34, further comprising selecting the update synchronization information periodicity value to be larger than a default synchronization information periodicity value of the radio access network Example Embodiment 39

The method of Example Embodiment 38, further comprising selecting, for use as the synchronization signal, a synchronization signal sequence that has a length which facilitates less than maximum-shot detection by the wireless terminal.

Example Embodiment 40

The method of Example Embodiment 38, further comprising repeating the synchronization signal in a synchronization signal burst set to facilitate detection by the wireless terminal.

Example Embodiment 41

The method of Example Embodiment 38, further comprising: selecting, for use as the synchronization signal, a synchronization signal sequence that has a length which facilitates less than maximum-shot detection by the wireless terminal; and repeating the synchronization signal in a synchronization signal burst set to facilitate detection by the wireless terminal.

Example Embodiment 42

A wireless terminal comprising: receiver circuitry configured to receive wireless communications, including synchronization signal information transmitted according to an update synchronization information periodicity value, over an air interface from a radio access network; processor circuitry configured to detect the synchronization signal information using a default synchronization information periodicity value in a synchronization signal detection process.

Example Embodiment 43

The wireless terminal of Embodiment 42, wherein the update synchronization information periodicity value is smaller than a default synchronization information periodicity value previously used by the wireless terminal, and wherein the processor circuitry is configured to detect plural receptions of the synchronization signal in a detection window corresponding to the default synchronization information periodicity value.

Example Embodiment 44

The wireless terminal of Example Embodiment 42, wherein the update synchronization information periodicity value is larger than a default synchronization information periodicity value previously used by the wireless terminal, and wherein the processor circuitry is configured to adjust detection performance criteria for the update synchronization information periodicity value relative to the default synchronization information periodicity value.

Example Embodiment 45

The wireless terminal of Example Embodiment 42, wherein the update synchronization information periodicity value is larger than a default synchronization information periodicity value previously used by the wireless terminal, and wherein the processor circuitry is configured to detect a signal sequence that has a length which facilitates less than maximum-shot detection by the wireless terminal.

Example Embodiment 46

The wireless terminal of Example Embodiment 42, wherein the update synchronization information periodicity value is larger than a default synchronization information periodicity value previously used by the wireless terminal, and wherein the processor circuitry is configured to receive plural instances of the synchronization signal in a synchronization signal burst set to facilitate detection by the wireless terminal.

Example Embodiment 47

The wireless terminal of Example Embodiment 42, wherein the update synchronization information periodicity value is larger than a default synchronization information periodicity value previously used by the wireless terminal, and wherein the processor circuitry is configured: to detect a signal sequence that has a length which facilitates less than maximum-shot detection by the wireless terminal; and to receive plural instances of the synchronization signal in a synchronization signal burst set to facilitate detection by the wireless terminal.

Example Embodiment 48

A method in a wireless terminal comprising: receiving wireless communications, including synchronization signal information transmitted according to an update synchronization information periodicity value over an air interface from a radio access network; using processor circuitry to

Example Embodiment 49

The method of Example Embodiment 48, wherein the update synchronization information periodicity value is smaller than a default synchronization information periodicity value previously used by the wireless terminal, and wherein the method further comprising detecting plural receptions of the synchronization signal in a detection window corresponding to the default synchronization information periodicity value.

Example Embodiment 50

The method of Example Embodiment 48, wherein the update synchronization information periodicity value is larger than a default synchronization information periodicity value previously used by the wireless terminal, and wherein the method further comprises adjusting detection performance criteria for the update synchronization information periodicity value relative to the default synchronization information periodicity value.

Example Embodiment 51

The method of Example Embodiment 48, wherein the update synchronization information periodicity value is larger than a default synchronization information periodicity value previously used by the wireless terminal, and wherein the method further comprises detecting a signal sequence that has a length which facilitates less than maximum-shot detection by the wireless terminal.

Example Embodiment 52

The method of Example Embodiment 48, wherein the update synchronization information periodicity value is larger than a default synchronization information periodicity value previously used by the wireless terminal, and wherein the method further comprises receiving plural instances of the synchronization signal in a synchronization signal burst set to facilitate detection by the wireless terminal.

Example Embodiment 53

The method of Example Embodiment 48, wherein the update synchronization information periodicity value is larger than a default synchronization information periodicity value previously used by the wireless terminal, and wherein the method further comprises: detecting a signal sequence that has a length which facilitates less than maximum-shot detection by the wireless terminal; and receiving plural instances of the synchronization signal in a synchronization signal burst set to facilitate detection by the wireless terminal.

Example Embodiment 54

A wireless terminal comprising: receiver circuitry configured to receive wireless communications over an air interface from a radio access network; processor circuitry configured to attempt to obtain from the wireless communications a synchronization information periodicity value for use in a synchronization signal detection process relative to a neighboring cell.

Example Embodiment 55

The wireless terminal of Example Embodiment 54, wherein the processor circuitry is configured to obtain the synchronization information periodicity value for the neighboring cell from a system information block (SIB) transmitted by the radio access network.

Example Embodiment 56

The wireless terminal of Example Embodiment 54, wherein the processor circuitry is configured to obtain the synchronization information periodicity value from a radio access network via signaling.

Example Embodiment 57

The wireless terminal of Example Embodiment 56, wherein the signaling from the radio access network comprises an inter-frequency neighboring cell list, and wherein the signaling further comprises a synchronization information periodicity value for plural cells on the list.

Example Embodiment 58

The wireless terminal of Example Embodiment 57, wherein the signaling from the radio access network comprises an inter-frequency neighboring cell list, and wherein the signaling further comprises a default synchronization information periodicity value and an update synchronization information periodicity value for plural cells on the list.

Example Embodiment 59

The wireless terminal of Example Embodiment 56, wherein the signaling from the radio access network comprises an intra-frequency neighboring cell list, and wherein the signaling further comprises a synchronization information periodicity value for plural cells on the list.

Example Embodiment 60

The wireless terminal of Example Embodiment 54, wherein the processor circuitry is configured, if it cannot obtain the synchronization information periodicity value for use in the synchronization signal detection process relative to the neighboring cell, uses a smallest synchronization information periodicity value to detect the synchronization signal for the neighboring cell.

Example Embodiment 61

A method in a wireless terminal comprising: receiving wireless communications over an air interface from a radio access network; using processor circuitry to attempt to obtain from the wireless communications a synchronization information periodicity value for use in a synchronization signal detection process relative to a neighboring cell.

Example Embodiment 62

The method of Example Embodiment 61, further comprising obtaining the synchronization information periodicity value for the neighboring cell from a system information block (SIB) transmitted by the radio access network.

Example Embodiment 63

The method of Example Embodiment 61, further comprising obtaining the synchronization information periodicity value from a radio access network via signaling.

Example Embodiment 64

The method of Example Embodiment 63, wherein the signaling from the radio access network comprises an inter-frequency neighboring cell list, and wherein the signaling further comprises a synchronization information periodicity value for plural cells on the list.

Example Embodiment 65

The method of Example Embodiment 63, wherein the signaling from the radio access network comprises an inter-frequency neighboring cell list, and wherein the signaling further comprises a default synchronization information periodicity value and an update synchronization information periodicity value for plural cells on the list.

Example Embodiment 66

The method of Example Embodiment 63, wherein the signaling from the radio access network comprises an intra-frequency neighboring cell list, and wherein the signaling further comprises a synchronization information periodicity value for plural cells on the list.

Example Embodiment 67

The method of Example Embodiment 61, further comprising, if the wireless terminal cannot obtain the synchronization information periodicity value for use in the synchronization signal detection process relative to the neighboring cell, using a smallest synchronization information periodicity value to detect the synchronization signal for the neighboring cell.

Example Embodiment 68

A node of a radio access network comprising: processor circuitry configured to include in a signal a synchronization information periodicity value for use in a synchronization signal detection process relative to a neighboring cell; and transmitter circuitry configured to transmit the signal over an air interface to a wireless terminal.

Example Embodiment 69

The node of Example Embodiment 68, wherein the processor circuitry is configured to include the synchronization information periodicity value in a system information block (SIB) transmitted by the radio access network.

Example Embodiment 70

The node of Example Embodiment 68, wherein the signaling comprises an inter-frequency neighboring cell list, and wherein the signaling further comprises a synchronization information periodicity value for plural cells on the list.

Example Embodiment 71

The node of Example Embodiment 68, wherein the signaling from the radio access network comprises an inter-frequency neighboring cell list, and wherein the signaling further comprises a default synchronization information periodicity value and an update synchronization information periodicity value for plural cells on the list.

Example Embodiment 72

The node of Example Embodiment 68, wherein the signaling from the radio access network comprises an intra-frequency neighboring cell list, and wherein the signaling further comprises a synchronization information periodicity value for plural cells on the list.

Example Embodiment 73

A method in a node of a radio access network comprising: using processor circuitry to include in a signal a synchronization information periodicity value for use in a synchronization signal detection process relative to a neighboring cell; and transmitting the signal over an air interface to a wireless terminal.

Example Embodiment 74

The method of Example Embodiment 73, further comprising including the synchronization information periodicity value in a system information block (SIB) transmitted by the radio access network.

Example Embodiment 75

The method of Example Embodiment 73, wherein the signaling comprises an inter-frequency neighboring cell list, and wherein the signal further comprises a synchronization information periodicity value for plural cells on the list.

Example Embodiment 76

The method of Example Embodiment 73, wherein the signaling from the radio access network comprises an inter-frequency neighboring cell list, and wherein the signal further comprises a default synchronization information periodicity value and an update synchronization information periodicity value for plural cells on the list.

Example Embodiment 77

The method of Example Embodiment 73, wherein the signal from the radio access network comprises an intra-frequency neighboring cell list, and wherein the signaling further comprises a synchronization information periodicity value for plural cells on the list.

Example Embodiment 78

A wireless terminal comprising:
receiver circuitry configured to receive wireless communications including synchronization signal information transmitted according to a node-utilized synchronization information periodicity value over an air interface from a radio access network;
processor circuitry configured to detect the synchronization signal information when a default synchronization information periodicity value which has been used by the wireless terminal differs from the node-utilized synchronization information periodicity value.

Example Embodiment 79

The wireless terminal of Example Embodiment 78, wherein the processor circuitry is configured to change from using a first synchronization information periodicity value to using a second synchronization information periodicity value to detect a synchronization signal included in the received wireless communications, and wherein the second synchronization information periodicity value is the node-utilized synchronization information periodicity value.

Example Embodiment 80

The wireless terminal of Example Embodiment 79, wherein the second synchronization information periodicity value is signaled to the wireless terminal from the radio access network.

Example Embodiment 81

The wireless terminal of Example Embodiment 79, wherein the processor circuitry configured to change from using the first synchronization information periodicity value to using the second synchronization information periodicity value upon occurrence of a predetermined event.

Example Embodiment 81

The wireless terminal of Example Embodiment 78, wherein the processor circuitry is configured to detect the synchronization signal information using the default synchronization information periodicity value in a synchronization signal detection process.

Example Embodiment 82

The wireless terminal of Example Embodiment 81, wherein the update synchronization information periodicity value is smaller than a default synchronization information periodicity value previously used by the wireless terminal, and wherein the processor circuitry is configured to detect plural receptions of the synchronization signal in a detection window corresponding to the default synchronization information periodicity value.

Example Embodiment 83

The wireless terminal of Example Embodiment 81, wherein the update synchronization information periodicity value is larger than a default synchronization information periodicity value previously used by the wireless terminal, and wherein the processor circuitry is configured to adjust detection performance criteria for the update synchronization information periodicity value relative to the default synchronization information periodicity value.

Example Embodiment 84

The wireless terminal of Example Embodiment 81, wherein the update synchronization information periodicity value is larger than a default synchronization information periodicity value previously used by the wireless terminal, and wherein the processor circuitry is configured to detect a signal sequence that has a length which facilitates less than maximum-shot detection by the wireless terminal.

Example Embodiment 85

The wireless terminal of Example Embodiment 81, wherein the update synchronization information periodicity value is larger than a default synchronization information periodicity value previously used by the wireless terminal, and wherein the processor circuitry is configured to receive plural instances of the synchronization signal in a synchronization signal burst set to facilitate detection by the wireless terminal.

Example Embodiment 86

The wireless terminal of Example Embodiment 78, wherein the processor circuitry is further configured to attempt to obtain the node-utilized synchronization information periodicity value from radio access network for use in a synchronization signal detection process relative to a neighboring cell.

Example Embodiment 87

The wireless terminal of Example Embodiment 86, wherein the processor circuitry is further configured to obtain the synchronization information periodicity value for the neighboring cell from a system information block (SIB) transmitted by the radio access network.

Example Embodiment 88

The wireless terminal of Example Embodiment 86, wherein the processor circuitry is further configured to obtain the synchronization information periodicity value from a radio access network via signaling.

Example Embodiment 89

A method in a wireless terminal comprising:
receiving wireless communications including synchronization signal information transmitted according to a node-utilized synchronization information periodicity value over an air interface from a radio access network;
using processor circuitry to detect the synchronization signal information when a default synchronization information periodicity value which has been used by the wireless terminal differs from the node-utilized synchronization information periodicity value.

Example Embodiment 90

The method of Example Embodiment 89, further comprising using the processor circuitry to change from using a first synchronization information periodicity value to using a second synchronization information periodicity value to detect a synchronization signal included in the received wireless communications, and wherein the second synchronization information periodicity value is the node-utilized synchronization information periodicity value.

Example Embodiment 91

The method of Example Embodiment 89, further comprising using the processor circuitry to detect the synchronization signal information using the default synchronization information periodicity value in a synchronization signal detection process.

Example Embodiment 92

The method of Example Embodiment 89, further comprising using the processo94r circuitry to attempt to obtain the node-utilized synchronization information periodicity value from radio access network for use in a synchronization signal detection process relative to a neighboring cell.

Example Embodiment 93

A node of a radio access network comprising:
processor circuitry configured to include, in wireless communications, synchronization signal information to be transmitted according to anode-utilized synchronization information periodicity value which differs from a synchronization information periodicity value utilized by a wireless terminal;
transmitter circuitry configured to transmit the wireless communications including the synchronization signal information over an air interface to the wireless terminal.

Example Embodiment 94

The node of claim 17, wherein
the processor circuitry is configured to select an update synchronization information periodicity value for use in transmitting the synchronization signal information;
the transmitter circuitry is configured to transmit the update synchronization information periodicity value and the synchronization signal information over the air interface to the wireless terminal served by the node.

Example Embodiment 95

The node of Example Embodiment 93, wherein the node-utilized synchronization information periodicity value is a synchronization information periodicity value of a neighboring cell; and wherein
the processor circuitry is configured to include in a signal the synchronization information periodicity value for use in a synchronization signal detection process relative to a neighboring cell; and
the transmitter circuitry is configured to transmit the signal over an air interface to the wireless terminal.

Example Embodiment 96

A method in a node of a radio access network comprising:
using processor circuitry to include, in wireless communications, synchronization signal information to be transmitted according to anode-utilized synchronization information periodicity value which differs from a synchronization information periodicity value utilized by a wireless terminal;
transmitting the wireless communications including the synchronization signal information over an air interface to the wireless terminal.

Example Embodiment 97

A wireless terminal comprising:
receiver circuitry configured to receive broadcasting system information, including information used for configuring a second periodicity of a synchronization signal block (SSB) comprising, at least, a primary synchronization signal (PSS) and a secondary synchronization signal (SSS) and a physical broadcast channel (PBCH); and
processor circuitry configured to acquire time and frequency synchronization based on the reception of the SSB, wherein for an initial cell selection, a first periodicity of the SSB is assumed for acquiring the time and frequency synchronization.

Example Embodiment 98

The wireless terminal of example embodiment 97, wherein the first periodicity is a default periodicity value and the second periodicity is an update periodicity.

Example Embodiment 99

The wireless terminal of example embodiment 97, wherein the first periodicity is a default value.

Example Embodiment 100

The wireless terminal of example embodiment 97, wherein the second periodicity is received in a signal from the radio access network.

Example Embodiment 101

The wireless terminal of example embodiment 97, wherein the processor circuitry is configured to change from using the first periodicity to using the second periodicity upon occurrence of a predetermined event.

Example Embodiment 102

The wireless terminal of example embodiment 101, wherein the predetermined event comprises receipt of a switch signal indicating an updated periodicity from the radio access network.

Example Embodiment 103

A method in a wireless terminal comprising:
receiving broadcasting system information, including information used for configuring a second periodicity of a synchronization signal block (SSB) comprising, at least, a primary synchronization signal (PSS) and a secondary synchronization signal (SSS) and a physical broadcast channel (PBCH); and
using processor circuitry to acquire time and frequency synchronization based on the reception of the SSB, wherein for an initial cell selection, a first periodicity of the SSB is assumed for acquiring the time and frequency synchronization.

Example Embodiment 104

The method of example embodiment 103, wherein the first periodicity is a default periodicity and the second periodicity is an update periodicity.

Example Embodiment 105

The method of example embodiment 103, wherein the first periodicity is a default value.

Example Embodiment 106

The method of example embodiment 103, further comprising receiving the second periodicity in a signal from the radio access network.

Example Embodiment 107

The method of example embodiment 103, further comprising using the processor circuitry to change from using the first periodicity to using the second periodicity upon occurrence of a predetermined event.

Example Embodiment 108

The method of example embodiment 107, wherein the predetermined event comprises receipt of a switch signal indicating an updated periodicity from the radio access network.

Example Embodiment 109

A node of a radio access network comprising:
processor circuitry configured to generate:
  system information, including information used for configuring a second periodicity of a synchronization signal block (SSB) comprising, at least, a primary synchronization signal (PSS) and a secondary synchronization signal (SSS) and a physical broadcast channel (PBCH); and
  a signal to indicate to the wireless terminal that the wireless terminal is to update the periodicity utilized by the wireless terminal when the wireless terminal is to change from using a first periodicity to using the second periodicity;
transmitter circuitry configured to broadcast the system information and the signal over an air interface to the wireless terminal.

Example Embodiment 110

The node of example embodiment 109, wherein the first periodicity is a default periodicity and the second periodicity is an update periodicity.

Example Embodiment 111

The node of example embodiment 109, wherein the processor circuitry is configured to include the second periodicity in the signal upon occurrence of a predetermined event.

Example Embodiment 112

A method in a node of a radio access network comprising:
using processor circuitry to generate system information, including:
  information used for configuring a second periodicity of a synchronization signal block (SSB) comprising, at least, a primary synchronization signal (PSS) and a secondary synchronization signal (SSS) and a physical broadcast channel (PBCH); and
  a signal to indicate to the wireless terminal that the wireless terminal is to update the periodicity utilized by the wireless terminal when the wireless terminal is to change from using a first periodicity to using the second periodicity;
broadcasting the system information and the signal over an air interface to the wireless terminal.

Example Embodiment 114

The method of example embodiment 112, wherein the first periodicity is a default periodicity and the second periodicity is an update periodicity.

Example Embodiment 115

The method of example embodiment 112, further comprising including the second periodicity in the signal upon occurrence of a predetermined event.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

One or more of the following documents (all of which are incorporated herein by reference) may be relevant to the technology described herein:

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A terminal apparatus comprising:
   receiver circuitry configured to receive, from a base station apparatus, dedicated signaling comprising first information used for configuring a first periodicity, the first periodicity being for a first measurement timing; and
   processor circuitry configured to perform, based on the first periodicity, a measurement based on a first block comprising a primary synchronization signal (PSS), a secondary synchronization signal (SSS) and a physical broadcast channel (PBCH);
   wherein:
   the receiver circuitry is configured to receive, from the base station apparatus, the dedicated signaling comprising second information used for configuring a second periodicity, the second periodicity being for a second measurement timing,
   the processor circuitry is configured to perform, based on the second periodicity, the measurement based on a second block comprising a PSS, a SSS and a PBCH, and
   a value of the second periodicity is always configured as a value smaller than a value of the first periodicity.

2. The terminal apparatus according to claim 1, wherein the second information is different from the first information.

3. A method in a terminal apparatus comprising:
   receiving, from a base station apparatus, dedicated signaling comprising first information used for configuring a first periodicity, the first periodicity being for a first measurement timing;
   performing, based on the first periodicity, a measurement based on a first block comprising a primary synchronization signal (PSS), a secondary synchronization signal (SSS) and a physical broadcast channel (PBCH);
   receiving, from the base station apparatus, the dedicated signaling comprising second information used for configuring a second periodicity, the second periodicity being for a second measurement timing,
   performing, based on the second periodicity, the measurement based on a second block comprising a PSS, a SSS and a PBCH, and a value of the second periodicity is always configured as a value smaller than a value of the first periodicity.

4. The method of claim 3, wherein the second information is different from the first information.

5. A base station apparatus comprising:
   transmitter circuitry configured to transmit dedicated signaling comprising first information used for configuring a first periodicity, the first periodicity being for a first measurement timing of a first block comprising a primary synchronization signal (PSS), a secondary synchronization signal (SSS) and a physical broadcast channel (PBCH);
   wherein the transmitter circuitry is configured to transmit the dedicated signaling comprising second information used for configuring a second periodicity, the second periodicity being for a second measurement timing of a second block comprising a PSS, a SSS and a PBCH, and wherein a value of the second periodicity is always configured as a value smaller than a value of the first periodicity.

6. The base station apparatus according to claim 5, wherein the second information is different from the first information.

7. A method in a base station apparatus comprising:
   transmitting dedicated signaling comprising first information used for configuring a first periodicity, the first periodicity being for a first measurement timing of a first block comprising a primary synchronization signal (PSS), a secondary synchronization signal (SSS) and a physical broadcast channel (PBCH);
   transmitting the dedicated signaling comprising second information used for configuring a second periodicity, the second periodicity being for a second measurement timing of a second block comprising a PSS, a SSS and a PBCH, and
   a value of the second periodicity is always configured as a value smaller than a value of the first periodicity.

8. The method of claim 7, wherein the second information is different from the first information.

\* \* \* \* \*

UNITED STATES PATENT AND TRADEMARK OFFICE
CERTIFICATE OF CORRECTION

Page 1 of 2

PATENT NO. : 10,313,993 B2
APPLICATION NO. : 15/934788
DATED : June 4, 2019
INVENTOR(S) : Sheng et al.

It is certified that error appears in the above-identified patent and that said Letters Patent is hereby corrected as shown below:

In the Claims

Column 40, Line 25 (Claim 3), please change "timing," to -- timing; and --;

Column 40, Line 26 (Claim 3), please delete the following paragraph "performing, based on the second periodicity, the measurement based on a second block comprising a PSS, a SSS and a PBCH, and a value of the second periodicity is always configured as a value smaller than a value of the first periodicity." and replace it with the following paragraphs:
-- performing, based on the second periodicity, the measurement based on a second block comprising a PSS a SSS and a PBCH,
wherein a value of the second periodicity is always configured as a value smaller than a value of the first periodicity. --;

Column 40, Line 37 (Claim 5), please change "timing of a first" to -- timing for a measurement based on a first --;

Column 40, Line 41 (Claim 5), delete the following paragraph: "wherein the transmitter circuitry is configured to transmit the dedicated signaling comprising second information used for configuring a second periodicity, the second periodicity being for a second measurement timing of a second block comprising a PSS, a SSS and a PBCH, and wherein a value of the second periodicity is always configured as a value smaller than a value of the first periodicity." and please add the following paragraphs:
-- wherein the transmitter circuitry is configured to transmit the dedicated signaling comprising second information used for configuring a second periodicity, the second periodicity being for a second measurement timing for the measurement based on a second block comprising a PSS, a SSS and a PBCH, and
wherein a value of the second periodicity is always configured as a value smaller than a value of the first periodicity. --;

Signed and Sealed this
Seventeenth Day of December, 2019

Andrei Iancu
*Director of the United States Patent and Trademark Office*

Column 40, Line 55 (Claim 7), please change "timing of a" to -- timing for a measurement based on --;

Column 40, Line 58 (Claim 7), please change "(PBCH);" to -- (PBCH); and --;

Column 40, Line 62 (Claim 7), please change "timing of a" to -- timing for the measurement based on --; and Column 40, Line 64 (Claim 7), please change "a value" to -- wherein a value --.